(12) United States Patent
Kuhlman

(10) Patent No.: US 11,279,779 B2
(45) Date of Patent: Mar. 22, 2022

(54) POLYETHYLENE COPOLYMERS HAVING A PARTICULAR COMONOMER DISTRIBUTION

(71) Applicant: Univation Technologies, LLC, Houston, TX (US)

(72) Inventor: Roger L. Kuhlman, Freeport, TX (US)

(73) Assignee: Univation Technologies, LLC, Houston, TX (US)

( * ) Notice: Subject to any disclaimer, the term of this patent is extended or adjusted under 35 U.S.C. 154(b) by 177 days.

(21) Appl. No.: 16/654,511

(22) Filed: Oct. 16, 2019

(65) Prior Publication Data

US 2020/0048379 A1    Feb. 13, 2020

Related U.S. Application Data

(62) Division of application No. 15/568,662, filed as application No. PCT/US2016/028545 on Apr. 21, 2016, now Pat. No. 10,494,462.

(60) Provisional application No. 62/151,816, filed on Apr. 23, 2015.

(51) Int. Cl.

| | |
|---|---|
| *C08F 4/6592* | (2006.01) |
| *C08F 210/16* | (2006.01) |
| *C08L 23/08* | (2006.01) |
| *C08F 210/02* | (2006.01) |
| *C08F 4/659* | (2006.01) |
| *C08F 2/01* | (2006.01) |
| *C08F 2/04* | (2006.01) |
| *C08F 2/34* | (2006.01) |
| *C08F 210/14* | (2006.01) |

(52) U.S. Cl.
CPC .............. *C08F 210/02* (2013.01); *C08F 2/01* (2013.01); *C08F 2/04* (2013.01); *C08F 2/34* (2013.01); *C08F 4/65904* (2013.01); *C08F 4/65925* (2013.01); *C08F 4/65927* (2013.01); *C08F 210/14* (2013.01); *C08L 23/0815* (2013.01)

(58) Field of Classification Search
CPC .............. C08F 4/65904; C08F 4/65025; C08F 4/65927; C08F 210/16; C08L 23/0815
See application file for complete search history.

(56) References Cited

U.S. PATENT DOCUMENTS

| | | | |
|---|---|---|---|
| 6,462,161 | B1 | 10/2002 | Cady et al. |
| 7,018,710 | B2 | 3/2006 | Kallio et al. |
| 7,141,632 | B2 | 11/2006 | Vaughan et al. |
| 8,383,754 | B2 | 2/2013 | Yang et al. |
| 8,772,426 | B2 | 7/2014 | Chai et al. |
| 8,846,841 | B2 | 9/2014 | Yang et al. |
| 9,006,342 | B2 | 4/2015 | Van Dun et al. |
| 9,540,460 | B2 | 1/2017 | Lester et al. |
| 2010/0121006 | A1 | 5/2010 | Cho et al. |
| 2011/0086990 | A1 | 4/2011 | Graham et al. |
| 2015/0126692 | A1 | 5/2015 | Sukhadia et al. |
| 2016/0347889 | A1 | 12/2016 | Lue et al. |

OTHER PUBLICATIONS

International Search Report & Written Opinion for related PCT Application PCT/US2016/028545, dated Jul. 26, 2016 (16 pgs).
Second Written Opinion for related PCT Application PCT/US2016/028545, dated Mar. 15, 2017 (6 pgs).
International Preliminary Report on Patentability for related PCT Application PCT/US2016/028545, dated Jul. 13, 2017 (19 pgs).
Cossoul, et al., "Homogeneous Copolymers of Ethylene with [alpha]-olefins Synthesized with Metallocene Catalysts and Their Use as Standards for TREF Calibration"; Macromolecular Symposium, vol. 330, No. 1 (Aug. 23, 2013) (12 pgs).
Filho, et al., "Measurement and mathematical modeling of molecular weight and chemical composition distributions of ethylene/a-olefin copolymers synthesized with a heterogeneous Ziegler-Natta catalyst"; Macromol. Chem. Phys. 201, 1226-1234 (Feb. 10, 2000) (9 pgs).

*Primary Examiner* — Caixia Lu
(74) *Attorney, Agent, or Firm* — Brooks, Cameron & Huebsch, PLLC

(57) ABSTRACT

Novel polyethylene copolymers having a relatively high comonomer partitioning tendency are disclosed as are methods for their preparation. The comonomer partitioning tendency is the tendency for a copolymer to have comonomer in the higher molecular weight chains. Novel metrics for describing the comonomer partitioning tendency are also disclosed.

12 Claims, 15 Drawing Sheets

FIGURE 13

Simulation Inputs and Results

| | | FRACTIONS | | | | OVERALL | | | | | | | |
|---|---|---|---|---|---|---|---|---|---|---|---|---|---|
| | Wt % | ß | $M_n$ | Mol Frac C6 | Description | $M_n$ | $M_w$ | $C_n$ | $C_w$ | $\chi_n$ | $\chi_w$ | $M_w/M_n$ (PDI) | $C_{w+1}/C_w$ (CDI) | $\chi_w/\chi_n$ (CPI) | CPI/ (PDI* CDI) |
| Fraction1 | 100 | 0.8 | 60,000 | 0.04 | Single | 62,424 | 120,372 | 0.115 | 0.110 | 6,846 | 14,471 | 1.93 | 1.18 | 2.11 | 0.93 |
| Fraction2 | 0 | 0 | 0 | 0 | | | | | | | | | | | |
| Fraction1 | 50 | 0.2 | 30,000 | 0.04 | Broad MW distribution | 53,216 | 230,111 | 0.112 | 0.110 | 5,834 | 25,665 | 4.32 | 1.06 | 4.40 | 0.96 |
| Fraction2 | 50 | 0.2 | 200,000 | 0.04 | | | | | | | | | | | |
| Fraction1 | 50 | 0.2 | 60,000 | 0.005 | Broad Composition | 56,849 | 112,366 | 0.122 | 0.112 | 6,360 | 20,007 | 1.98 | 1.72 | 3.15 | 0.92 |
| Fraction2 | 50 | 0.2 | 60,000 | 0.0800 | | | | | | | | | | | |
| Fraction1 | 50 | 0.3 | 20,000 | 0.06 | "ZN-Like" Composition | 37,042 | 186,931 | 0.146 | 0.090 | 3,321 | 7,193 | 5.05 | 1.76 | 2.17 | 0.24 |
| Fraction2 | 50 | 0.8 | 150,000 | 0.005 | | | | | | | | | | | |
| Fraction1 | 50 | 2.81155 | 166,376 | 0.06 | "BOCD-Like" Composition | 40,841 | 189,279 | 0.046 | 0.090 | 3,660 | 49,485 | 4.63 | 1.78 | 13.52 | 1.64 |
| Fraction2 | 50 | 0.107249 | 19,991 | 0.005 | | | | | | | | | | | |

FIGURE 15

| Description | $M_n$ | $M_w$ | $M_z$ | $M_w/M_n$ | $C_n$ | $C_w$ | $C_{w+1}$ | $C_{w+2}$ | $C_{w+1}/C_w$ | $\chi_n$ | $\chi_w$ | $\chi_z$ | $\chi_w/\chi_n$ | $\xi_c$ |
|---|---|---|---|---|---|---|---|---|---|---|---|---|---|---|
| Borstar FB 2230 | 12,675 | 174,843 | 810,088 | 13.794 | 0.168 | 0.126 | 0.184 | 0.232 | 1.458 | 1,599 | 37,091 | 254,877 | 23.195 | 1.153 |
| Eltex PF6212 | 24,183 | 97,880 | 229,973 | 4.048 | 0.139 | 0.108 | 0.125 | 0.138 | 1.149 | 2,620 | 12,422 | 32,400 | 4.741 | 1.019 |
| Evolue3010 | 14,262 | 118,734 | 513,293 | 8.325 | 0.164 | 0.120 | 0.160 | 0.188 | 1.339 | 1,709 | 18,826 | 133,415 | 11.018 | 0.989 |
| Elite5400 | 26,319 | 100,217 | 255,837 | 3.808 | 0.147 | 0.120 | 0.149 | 0.170 | 1.240 | 3,158 | 14,646 | 37,907 | 4.638 | 0.982 |
| Exceed1018 | 40,689 | 108,934 | 210,594 | 2.677 | 0.115 | 0.097 | 0.116 | 0.143 | 1.196 | 3,952 | 11,686 | 26,028 | 2.957 | 0.924 |
| Enable2010 | 22,577 | 86,134 | 183,600 | 3.815 | 0.161 | 0.103 | 0.114 | 0.131 | 1.101 | 2,336 | 7,894 | 17,070 | 3.380 | 0.804 |
| Total2710 | 31,972 | 96,417 | 198,404 | 3.016 | 0.105 | 0.079 | 0.092 | 0.116 | 1.166 | 2,519 | 6,870 | 14,187 | 2.728 | 0.776 |
| LD103 | 16,013 | 122,281 | 362,027 | 7.636 | 0.212 | 0.136 | 0.149 | 0.168 | 1.093 | 2,178 | 12,962 | 39,428 | 5.951 | 0.713 |
| LL3001 | 25,274 | 113,763 | 348,279 | 4.501 | 0.175 | 0.119 | 0.185 | 0.231 | 1.557 | 3,005 | 12,955 | 39,378 | 4.312 | 0.615 |
| Dowlex2045 | 24,320 | 112,059 | 360,717 | 4.608 | 0.165 | 0.107 | 0.140 | 0.170 | 1.312 | 2,600 | 9,642 | 28,999 | 3.709 | 0.614 |

POLYETHYLENE COPOLYMERS HAVING A PARTICULAR COMONOMER DISTRIBUTION

CLAIM OF PRIORITY

This application is a Divisional of U.S. National Stage Application Ser. No. 15/568,662 filed Oct. 23, 2017 and published as U.S. Publication No. 2018-0155473 A1 on Jun. 7, 2018, which claims priority to International Application Number PCT/US2016/028545, filed Apr. 21, 2016 and published as WO 2016/172279 on Oct. 27, 2016, which claims the benefit to U.S. Provisional Application 62/151,816, filed Apr. 23, 2015, the entire contents of which are incorporated herein by reference in its entirety.

FIELD

The present disclosure relates to polyethylene copolymers having a particular comonomer distribution, to novel metrics for describing the comonomer distribution and to methods for obtaining the metrics.

BACKGROUND

It is well established that polyethylene copolymers (for example, ethylene alpha-olefin copolymers) may be prepared with a variety of catalysts, such as Ziegler-Natta catalysts, chromium based catalysts, metallocene catalysts, non-metallocene bulky ligand transition metal catalysts or combinations thereof.

Single site catalysts, such as metallocene catalysts, may be used to prepare polyethylene copolymers that are relatively homogeneous. In contrast to traditional Ziegler-Natta catalyst compositions, single site catalyst compositions, such as metallocene catalysts, are catalytic compounds in which each catalyst molecule contains one or only a few types of polymerization sites. Single site catalysts often produce polyethylene copolymers that have a narrow molecular weight distribution. Further, a single site catalyst will often incorporate comonomer among the molecules of the polyethylene copolymer at a relatively uniform rate. The molecular weight distribution and the amount of comonomer incorporation can be used to determine a composition distribution.

The composition distribution of a polyethylene copolymer refers to the distribution of comonomer, which forms short chain branches, among the molecules that comprise the polyethylene polymer. When the amount of short chain branches varies among the polyethylene molecules, the resin is said to have a "broad" composition distribution. When the amount of comonomer per 1000 carbons is similar among the polyethylene molecules of different chain lengths, the composition distribution is said to be "narrow".

It is generally known in the art that a polyolefin's composition distribution is largely dictated by the type of catalyst used and is typically invariable for a given catalyst system. Ziegler-Natta catalysts and chromium based catalysts produce resins with broad composition distributions (BCD), whereas metallocene catalysts normally produce resins with narrow composition distributions (NCD).

Resins having a broad orthogonal composition distribution (BOCD) in which the comonomer is incorporated predominantly in the high molecular weight chains can lead to improved physical properties, for example toughness properties and environmental stress crack resistance (ESCR).

Two of the most important analytical characterization tools for polyethylene copolymers are gel permeation chromatography (GPC) for molecular weight and temperature rising elution fractionation (TREF) for composition. The key metrics of number average molecular weight (Mn), weight average molecular weight ($M_w$) and z-average molecular weight ($M_z$) may be calculated from GPC according to the following equations:

$$M_n = \Sigma N_i M_i / \Sigma N_i$$

$$M_w = \Sigma N_i M_i^2 / \Sigma N_i M_i$$

$$M_z = \Sigma N_i M_i^3 / \Sigma N_i M_i^2$$

where $N_i$ is the number of copolymers having molecular weight $M_i$.

GPC data are typically represented by plotting the mass fraction ($N_i M_i$) on the y-axis, and molecular weight ($M_i$) on the x-axis. $N_i$ may then be obtained by dividing $N_i M_i$ by $M_i$, so that the above equations are easily solved. The availability of such metrics from GPC measurements makes it straightforward to correlate the metrics with polymer properties and performance.

In contrast, TREF data is typically presented without any accompanying metrics. This makes is difficult to correlate TREF data with polymer performance. A typical TREF curve is displayed by plotting mass fraction ($N_i M_i$) on the y-axis, and elution temperature on the x-axis. However, it is more useful and informative to convert the temperature axis to a composition measure, such as weight fraction of comonomer. This may be achieved by using a calibration curve, or by directly measuring the composition of the effluent by infra-red or NMR spectroscopy. In this way, the data can be represented by $C_i$, which is the weight fraction of comonomer in a polymer chain.

It would be desirable to provide polyethylene copolymers having a broad orthogonal composition distribution, that is, with comonomer predominantly incorporated into the high molecular weight chains, and further desirable to provide metrics that may describe the comonomer distribution in such copolymers.

SUMMARY

There is provided a polyethylene copolymer, wherein the copolymer has a comonomer partitioning tendency ($\xi$) of greater than or equal to 1.16, and wherein the comonomer partitioning tendency is defined by equation (1):

$$\xi = \frac{CPI}{PDI \times CDI} \quad (1)$$

wherein
CPI is a comonomer partitioning index ($\chi_w/\chi_n$) wherein $\chi_w = \Sigma N_i (M_i C_i)^2 / N_i (M_i C_i)$ and $\chi_n = \Sigma N_i (M_i C_i) / \Sigma N_i$;
PDI is a polydispersity index ($M_w/M_n$);
CDI is a comonomer dispersity index ($C_{w+1}/C_w$) wherein $C_w = \Sigma N_i M_i C_i / \Sigma N_i M_i$ and $C_{w+1} = \Sigma N_i M_i C_i^2 / N_i M_i C_i$;
$M_i$ = molecular weight of a copolymer;
$N_i$ = number of copolymers having molecular weight $M_i$;
$C_i$ = weight fraction of comonomer in a copolymer;
$M_w$ = weight average molecular weight of the copolymer;
$M_n$ = number average molecular weight of the copolymer; and
$C_w$ = average weight fraction of comonomer in the copolymer.

The copolymer may have a comonomer partitioning tendency ($\xi$) of greater than or equal to about 1.2, or greater than or equal to about 1.3, or greater than or equal to about 1.4, or greater than or equal to about 1.5, or greater than or equal to about 1.6.

The copolymer may have a comonomer partitioning tendency ($\xi$) between about 1.16 and about 5, or between about 1.16 and about 4, or between about 1.16 and about 3, or between about 1.16 and about 2.

Copolymers having a comonomer partitioning tendency as disclosed herein have an increased weight fraction of comonomer in the higher molecular weight chains relative to the lower molecular weight chains. In contrast, prior art copolymers, having a comonomer partitioning tendency of less than 1.16, have a decreased proclivity for comonomer in the higher molecular weight chains, relative to the copolymers disclosed herein.

The comonomer may be one or more comonomers containing 3 to 16 carbon atoms, or from 3 to 12 carbon atoms, or from 4 to 10 carbon atoms, or from 4 to 8 carbon atoms. Suitable comonomers may include one or more alpha-olefins. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Advantageously, the copolymers disclosed herein may have an improved balance of stiffness, toughness and processibility. Advantageously, the herein disclosed comonomer partitioning tendency may provide a metric by which the properties of a copolymer may be predicted.

There may be i copolymer fractions that may be characterized by relative mass ($N_iM_i$), molecular weight ($M_i$), and weight fraction comonomer ($C_i$). $N_i$ may then be obtained by dividing $N_iM_i$ by $M_i$. The weight fraction of ethylene in the copolymer is then $E_i=1-C_i$.

The parameters $N_i$, $M_i$, $C_i$, $M_w$, $M_n$ and $C_w$ may be obtained using analytical techniques that provide molecular weight and comonomer composition data.

GPC for example, may provide molecular weight parameters $M_i$, $M_w$ and $M_n$. Other techniques for obtaining molecular weight parameters include, for example, matrix-assisted laser desorption/ionization-time-of-flight (MALDI-TOF), high temperature high pressure liquid chromatography or asymmetric flow field flow fractionation (AF4).

TREF, for example, may provide the comonomer composition parameter $C_i$. Other techniques for obtaining comonomer composition parameters, and therefore $C_i$, include, but are not limited to, crystallization analysis fractionation (CRYSTAF), crystallization elution fractionation (CEF), or differential scanning calorimetry (DSC).

Cross-fractionation chromatography, or other techniques which simultaneously provide both molecular weight and composition information, may be utilized to obtain $M_iC_i$.

Therefore PDI (polydispersity index) may be available from GPC, or other analyses that provide molecular weight distribution, CDI (comonomer dispersity index) may be available from TREF, or other analyses that provide composition distribution, and PDI, CDI and CPI (comonomer partitioning index) may all be available from cross-fractionation chromatography, or other analyses that simultaneously provide molecular weight and composition information.

When $M_w$, $M_n$ and $M_i$ are obtained from cross-fractionation chromatography a correction may be applied so as to provide values of these parameters which are the same or substantially the same as the values of these parameters when obtained by conventional GPC. These corrected or adjusted values of $M_w$, $M_n$ and $M_i$ may be used to calculate PDI and CPI. The so-calculated PDI and CPI may be used to calculate the comonomer partitioning tendency using equation (1) as hereinbefore disclosed.

The copolymer may have a melt index ($I_2$) ranging from about 0.01 to about 500, or from about 0.1 to about 100, or from about 0.2 to about 20.

The copolymer may have a melt index ratio (MIR or $I_{21}/I_2$) from about 5 to about 300, or from about 10 to about 150, or from about 15 to about 100, or from about 15 to about 70.

The copolymer may have a density from a low of about 0.87 g/cm$^3$, or about 0.88 g/cm$^3$, or about 0.89 g/cm$^3$, or about 0.90 g/cm$^3$, or about 0.91 g/cm$^3$ to a high of about 0.94 g/cm$^3$, or about 0.95 g/cm$^3$, or about 0.96 g/cm$^3$, or about 0.97 g/cm$^3$.

The copolymer may have a polydispersity (MWD) from about 1.5 to about 20, or from about 1.5 to about 13, or from about 2.5 to about 13.

There is also provided a method for preparing a polyethylene copolymer having a comonomer partitioning tendency of greater than 1.16, by polymerizing ethylene and one or more comonomers in the presence of one or more catalyst compositions.

The copolymer may have a comonomer partitioning tendency ($\xi$) of greater than or equal to about 1.2, or greater than or equal to about 1.3, or greater than or equal to about 1.4, or greater than or equal to about 1.5, or greater than or equal to about 1.6.

The copolymer may have a comonomer partitioning tendency ($\xi$) between about 1.16 and about 5, or between about 1.16 and about 4, or between about 1.16 and about 3, or between about 1.16 and about 2.

The comonomer may be one or more comonomers containing 3 to 16 carbon atoms, or from 3 to 12 carbon atoms, or from 4 to 10 carbon atoms, or from 4 to 8 carbon atoms. Suitable comonomers may include one or more alpha-olefins. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

The method may comprise polymerization in a gas phase, a slurry phase, a solution phase or a high pressure process or combinations thereof. The method may comprise polymerization in a single polymerization reactor or multiple polymerization reactors in series or parallel. The method may comprise polymerization in a single gas phase or slurry phase reactor. The method may comprise polymerization in a single gas phase reactor.

The catalyst compositions may comprise one or more catalyst compounds comprising a titanium, a zirconium or a hafnium atom. The catalyst compositions may comprise two or more catalyst compounds comprising a titanium, a zirconium or a hafnium atom. The catalyst compositions may comprise one or more catalyst compounds comprising a titanium, a zirconium or a hafnium atom wherein the catalyst compounds are one or more metallocene compounds and/or one or more Group 15 atom and metal-containing compounds.

The catalyst composition may comprise one or more catalyst compounds supported on a support or a carrier. Where there are two or more catalyst compounds these may be co-supported, that is supported on the same particles of support or carrier. Alternatively, the two or more catalyst compounds may be supported on different particles of support or carrier.

The catalyst compositions may comprise one or more non-supported catalyst compounds. That is the catalyst compounds may be dissolved in a suitable solvent so as to provide a catalyst composition comprising a solution of one or more catalyst compounds.

The catalyst compositions may further comprise one or more activators or co-catalysts. The one or more activators may be an alumoxane, for example methylalumoxane or modified methylalumoxane. The one or more activators may be neutral or ionizing compounds, such as a non-coordinating ionic activators or a Lewis acidic boranes.

In one embodiment the one or more catalyst compounds may comprise a compound with the following formula:

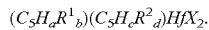

wherein, each $R^1$ is independently H, a hydrocarbyl group, a substituted hydrocarbyl group, or a heteroatom group; each $R^2$ is independently H, a hydrocarbyl group, a substituted hydrocarbyl group, or a heteroatom group; a and c are $\geq 3$; a+b=c+d=5; at least one $R^1$ and at least one $R^2$ is a hydrocarbyl or substituted hydrocarbyl group; adjacent groups $R^1$ and $R^2$ groups may be coupled to form a ring; and each X is independently a leaving group selected from a labile hydrocarbyl, substituted hydrocarbyl, or heteroatom group, or a divalent radical that links to an $R^1$ or $R^2$ group.

In another embodiment the one or more catalyst compounds may comprise a compound having at least one of the following formulas:

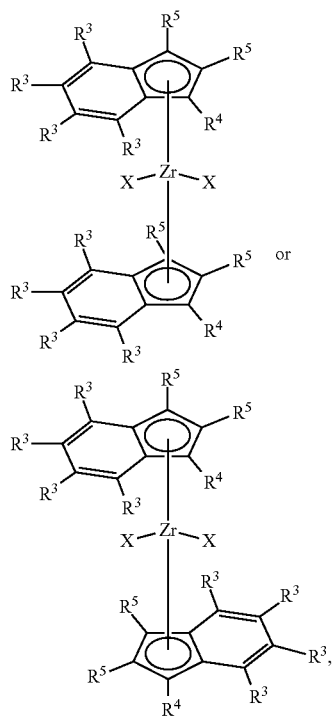

wherein each $R^3$ is independently H, a hydrocarbyl group, a substituted hydrocarbyl group, or a heteroatom group; $R^4$ is a hydrocarbyl group, a substituted hydrocarbyl group, or a heteroatom group; each $R^5$ is independently H, a hydrocarbyl group, a substituted hydrocarbyl group, or a heteroatom group; wherein $R^3$, $R^4$, and $R^5$ may be the same or different; wherein $R^3$, $R^4$, or $R^5$ groups may be joined with $R^3$, $R^4$, or $R^5$ groups on an opposing cyclopentadienyl structure to form one or more bridges if the number of atoms connecting the two cyclopentadienyl rings is $\geq 3$; and each X is independently a leaving group selected from a labile hydrocarbyl, substituted hydrocarbyl, or heteroatom group. X may be a divalent radical that links to a $R^3$, $R^4$, or $R^5$ substituent.

In another embodiment the one or more catalyst compounds may comprise a compound having the following formula:

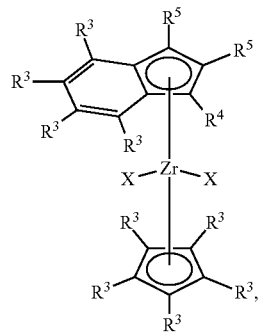

wherein, each $R^3$ is independently H, a hydrocarbyl group, a substituted hydrocarbyl group, or a heteroatom group; $R^4$ is a hydrocarbyl group, a substituted hydrocarbyl group, or a heteroatom group; each $R^5$ is independently H, a hydrocarbyl group, a substituted hydrocarbyl group, or a heteroatom group; wherein $R^3$, $R^4$, and $R^5$ may be the same or different; wherein $R^3$, $R^4$, or $R^5$ groups may be joined with $R^3$, $R^4$, or $R^5$ groups on an opposing cyclopentadienyl structure to form one or more bridges if the number of atoms connecting the two cyclopentadienyl rings is $\geq 3$; and each X is independently a leaving group selected from a labile hydrocarbyl, substituted hydrocarbyl, or heteroatom group. X may be a divalent radical that links to a $R^3$, $R^4$, or $R^5$ substituent.

In another embodiment the one or more catalyst compounds may comprise a compound having the following formula:

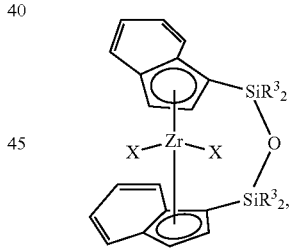

wherein, each $R^3$ is independently H, a hydrocarbyl group, substituted hydrocarbyl group, or a heteroatom group, wherein each $R^3$ may be the same or different. Each X is independently a leaving group selected from a labile hydrocarbyl, a substituted hydrocarbyl, a heteroatom group, or a divalent radical that links to an $R^3$ group.

The method may comprise any combination of the hereinabove disclosed catalyst compounds in any ratio.

There is also provided a method for determining the proclivity of a polyethylene copolymer to have comonomer in high molecular weight chains comprising the following steps:
  a) analyzing the copolymer, wherein the analysis comprises at least cross-fractionation chromatography or a technique affording equivalent data;
  b) obtaining the parameters $N_i$, $M_i$, $C_i$, $M_w$, $M_n$ and $C_w$ from the analysis; and c) calculating the comonomer partitioning tendency (ξ), using equation (1)

$$\xi = \frac{CPI}{PDI \times CDI} \quad (1)$$

wherein
CPI is a comonomer partitioning index ($\chi_w/\chi_n$) wherein $\chi_w = \Sigma N_i(M_iC_i)^2/\Sigma N_i(M_iC_i)$ and $\chi_n = \Sigma N_i(M_iC_i)/\Sigma N_i$;
PDI is a polydispersity index ($M_w/M_n$);
CDI is a comonomer dispersity index ($C_{w+1}/C_w$) wherein $C_w = \Sigma N_i M_i C_i/\Sigma N_i M_i$ and $C_{w+1} = \Sigma N_i M_i C_i^2/\Sigma N_i M_i C_i$,
$M_i$=molecular weight of a copolymer;
$N_i$=number of copolymers having molecular weight $M_i$;
$C_i$=weight fraction of comonomer in a copolymer;
$M_w$=weight average molecular weight of the copolymer;
$M_n$=number average molecular weight of the copolymer; and
$C_w$=average weight fraction of comonomer in the copolymer.

The analysis may comprise only cross-fractionation chromatography or a technique simultaneously affording molecular weight and compositional data. The analysis may also comprise a technique affording primarily molecular weight data, such as conventional gel permeation chromatography (GPC), matrix-assisted laser desorption/ionization-time-of-flight (MALDI-TOF), high temperature high pressure liquid chromatography or asymmetric flow field flow fractionation (AF4). The analysis may also comprise a technique affording primarily compositional data, such as temperature rising elution fractionation (TREF), crystallization analysis fractionation (CRYSTAF), crystallization elution fractionation (CEF) or differential scanning calorimetry (DSC).

When $M_w$, $M_n$ and $M_i$ are obtained from cross-fractionation chromatography a correction may be applied so as to provide values of these parameters which are the same or substantially the same as the values of these parameters when obtained by conventional GPC. These corrected or adjusted values of $M_w$, $M_n$ and $M_i$ may be used to calculate PDI and CPI. The so-calculated PDI and CPI may be used to calculate the comonomer partitioning tendency as hereinbefore disclosed.

The comonomer may be one or more comonomers containing 3 to 16 carbon atoms, or from 3 to 12 carbon atoms, or from 4 to 10 carbon atoms, or from 4 to 8 carbon atoms. Suitable comonomers may include one or more alpha-olefins. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

The copolymer may have a melt index ($I_2$) ranging from about 0.01 to about 500, or from about 0.1 to about 100, or from about 0.2 to about 20.

The copolymer may have a melt index ratio (MIR or $I_{21}/I_2$) ranging from about 5 to about 300, or from about 10 to about 150, or from about 15 to about 100, or from about 15 to about 70.

The copolymer may have a density ranging from a low of about 0.87 g/cm$^3$, or about 0.88 g/cm$^3$, or about 0.89 g/cm$^3$, or about 0.90 g/cm$^3$, or about 0.91 g/cm$^3$ to a high of about 0.94 g/cm$^3$, or about 0.95 g/cm$^3$, or about 0.96 g/cm$^3$, or about 0.97 g/cm$^3$.

The copolymer may have a polydispersity (MWD) ranging from about 1.5 to about 20, or from about 1.5 to about 13, or from about 2.5 to about 13.

The copolymer may have a comonomer partitioning tendency (ξ) of greater than or equal to about 1.2, or greater than or equal to about 1.3, or greater than or equal to about 1.4, or greater than or equal to about 1.5, or greater than or equal to about 1.6.

The copolymer may have a comonomer partitioning tendency (ξ) between about 1.16 and about 5, or between about 1.16 and about 4, or between about 1.16 and about 3, or between about 1.16 and about 2.

BRIEF DESCRIPTION OF THE DRAWINGS

FIG. 13 collects the results of simulations.
FIG. 15 collects data on comparative polyethylene copolymers.

DETAILED DESCRIPTION

Figure 1:
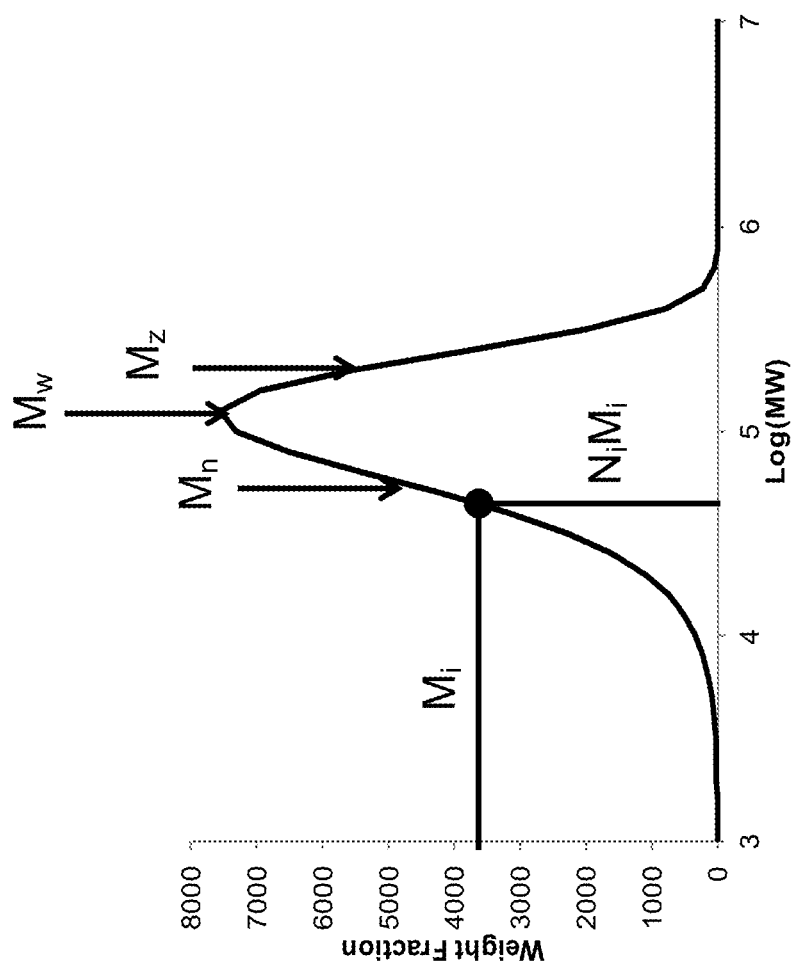
FIG. 1 is a GPC of a polyethylene copolymer.

Before the present compounds, components, compositions, and/or methods are disclosed and described, it is to be understood that unless otherwise indicated this invention is not limited to specific compounds, components, compositions, reactants, reaction conditions, ligands, transition metal compounds, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The present disclosure relates to novel polyethylene copolymers having an increased proclivity for comonomer in the higher molecular weight chains and to methods of making the copolymers. The disclosure also relates to metrics for describing the compositions of copolymers and to methods for obtaining the metrics.

The parameters $N_i$, $M_i$, $C_i$, $M_w$, $M_n$ and $C_w$ may be obtained using analytical techniques that provide molecular weight and comonomer composition. GPC for example, may provide $M_i$, $M_w$ and $M_n$. Other techniques for obtaining molecular weight include, but are not limited to, matrix-assisted laser desorption/ionization-time-of-flight (MALDI-TOF), high temperature high pressure liquid chromatography or asymmetric flow field flow fractionation (AF4). TREF, for example, may provide $C_i$. Other techniques for obtaining comonomer composition, and therefore $C_i$, include, but are not limited to, crystallization analysis fractionation (CRYSTAF), crystallization elution fractionation (CEF), differential scanning calorimetry (DSC). Cross-fractionation chromatography, or similar, techniques, which simultaneously provide both molecular weight and composition information may be utilized to obtain $M_iC_i$. Therefore PDI may be available from GPC, CDI may be available from TREF or similar analysis that provides composition distribution, and PDI, CDI and CPI may all be available from cross-fractionation chromatography or similar analysis. CPI is not available from conventional GPC and TREF, because the calculation requires separation by both molecular weight and composition.

When $M_w$, $M_n$ and $M_i$ are obtained from cross-fractionation chromatography a correction may be applied so as to provide values of these parameters which are the same or substantially the same as the values of these parameters when obtained by conventional GPC. These corrected values of $M_w$, $M_n$ and $M_i$ may be used to calculate PDI and CPI. The so-calculated PDI and CPI may be used to calculate the comonomer partitioning tendency as hereinbefore disclosed.

A polynomial correction may be applied to the GPC baseline of the CFC data to fit to $M_n$, $M_w$ and $M_z$ of the analyte as determined by conventional GPC analysis. Thus, the corrected value, $\log(MW)_{corr}$ may be calculated from the initial value, $\log(MW)_{orig}$, according to the equation:

$$\log(MW)_{corr} = a + b \times \log(MW)_{orig} + c \times \log(MW)_{orig}^2 + d \times \log(MW)_{orig}^3$$

The values of a, b, c, and d may be adjusted to minimize the value of $(\log(M_{n,corr}) - \log(M_n))^2 + (\log(M_{w,corr}) - \log(M_w))^2 + (\log(M_{z,corr}) - \log(M_z))^2$. Generally, the values of a, c and d are close to zero, while b is close to one.

Referring first to FIG. 1, a representative molecular weight distribution of a polyethylene copolymer as measured by GPC is illustrated. The particular copolymer has $M_n$ of 60,000, $M_w$ of 120,000 and $M_z$ of 180,000. As illustrated, any point on the GPC curve may be represented by a unique $M_i$ and $N_iM_i$ and then $M_n$, $M_w$ and $M_z$ may be obtained through the following relationships:

$$M_n = \Sigma N_i M_i / \Sigma N_i$$

$$M_w = \Sigma N_i M_i^2 / \Sigma N_i M_i$$

$$M_z = \Sigma N_i M_i^3 / \Sigma N_i M_i^2$$

wherein $M_z$ is the viscosity average molecular weight. The copolymer polydispersity, or molecular weight distribution, may be represented by $M_w/M_n$.

Figure 2:
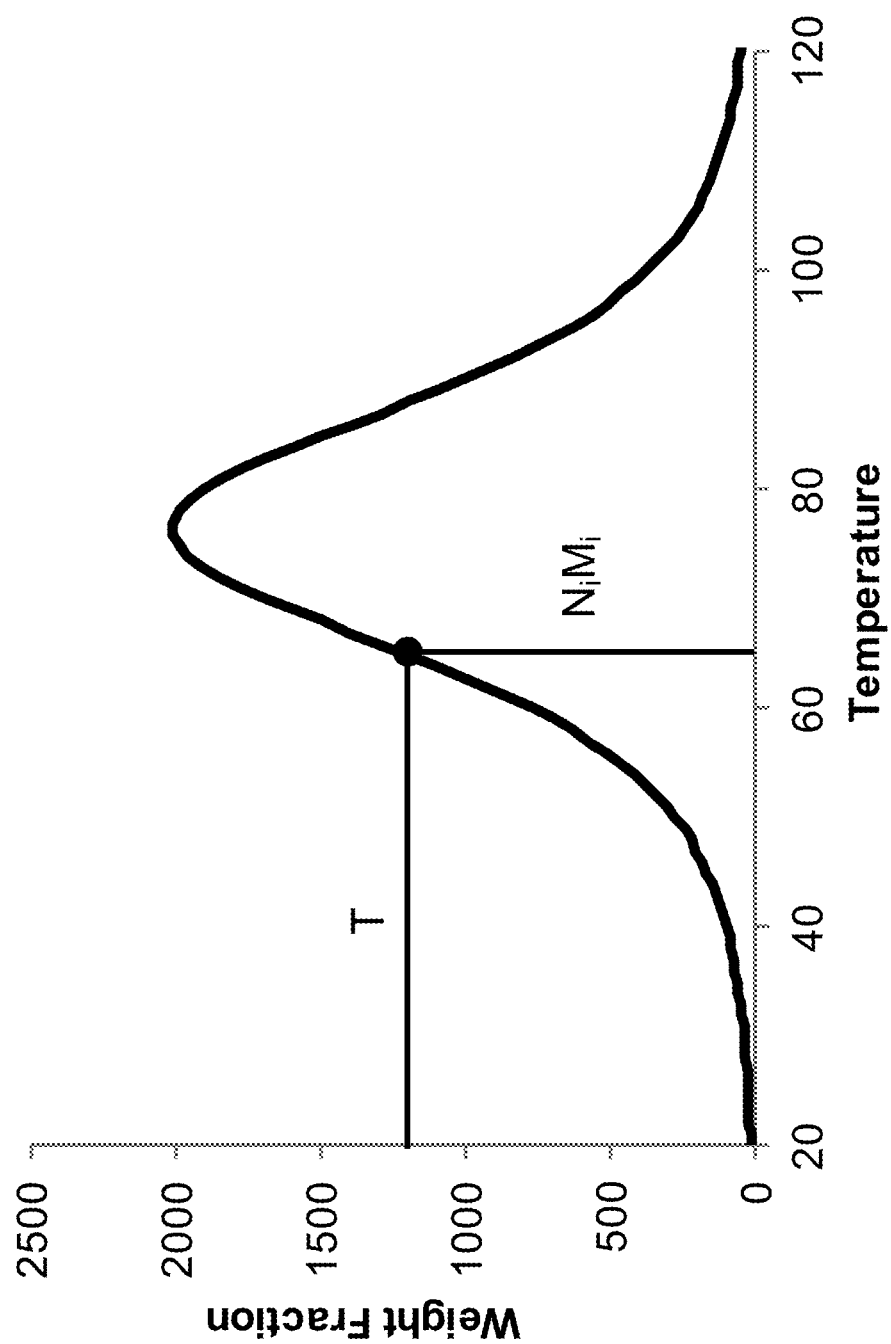
FIG. 2 is a typical TREF analysis of a polyethylene copolymer.

Referring now to FIG. 2, a representative comonomer distribution of a polyethylene copolymer as measured by TREF analysis is illustrated. Any point on the TREF curve may be represented by a unique temperature (T) and $N_iM_i$. However temperature is not a useful unit for polymer composition analysis and the temperature units may be converted to comonomer weight % or weight fraction of comonomer using calibration data by methods well known in the art. For example the mole fraction of 1-hexene may be obtained by the following equation:

Mole fraction 1-hexene=−0.161(Temp)+16.315.

wherein "Temp" is the elution temperature in degrees Celsius, and a negative solution is assigned a mole fraction=0. The mole fraction may then be converted to wt % 1-hexene using the formula weights of ethylene and 1-hexene.

Figure 3:
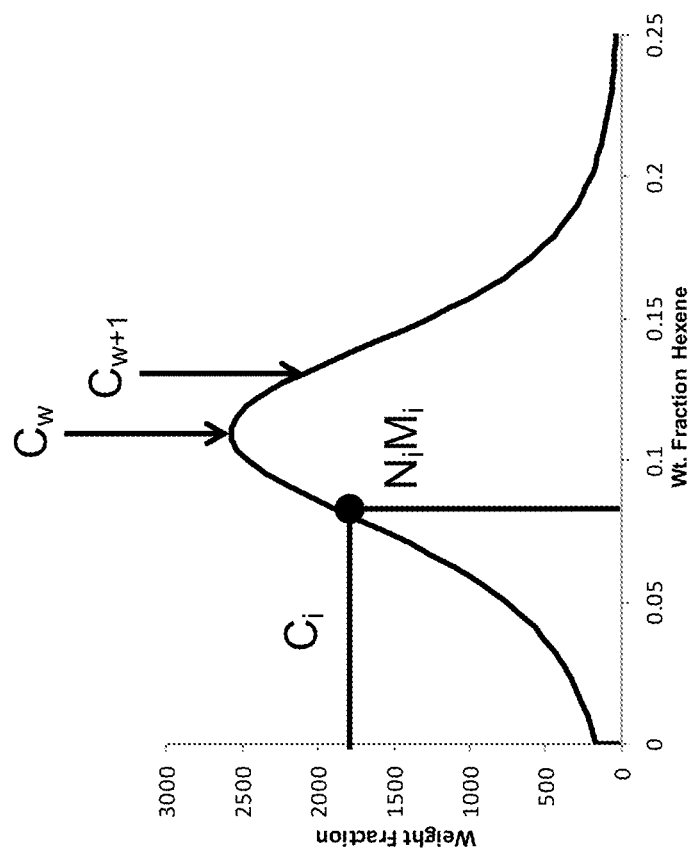
FIG. 3 is a TREF analysis with weight % comonomer plotted on the x-axis.

Referring now to FIG. 3, the TREF data of FIG. 2 has been converted to comonomer weight fraction (in this case 1-hexene weight fraction). Any point on the TREF curve may now be represented by a unique $C_1$ and $N_iM_i$, and using this data $C_w$ and $C_{w+1}$ may now be obtained through the following relationships:

$$C_w = \Sigma N_i M_i C_i / \Sigma N_i M_i$$

$$C_{w+1} = \Sigma N_i M_i C_i^2 / \Sigma N_i M_i C_1$$

Comonomer Dispersity Index (CDI) may now be defined as $C_{w+1}/C_w$. The comonomer dispersity index is a measure of the breadth of the comonomer distribution in the copolymer and can be likened to molecular weight distribution or polydispersity when considering molecular weight.

Referring further to FIG. 3, $C_w$ is 0.110, $C_{w+1}$ is 0.129 and CDI is therefore 0.129/0.110 which is 1.17. $C_w$ is the average weight fraction of comonomer in the copolymer which in this case is 0.11, or 11% by weight comonomer.

Figure 4:
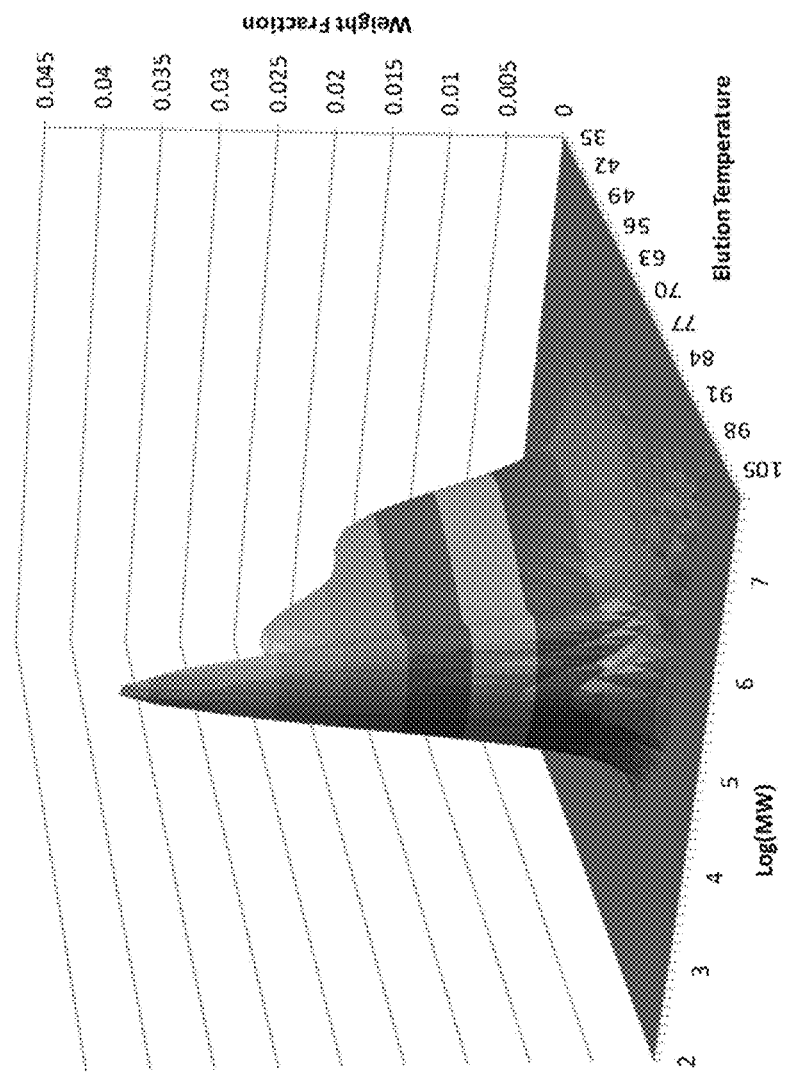
FIG. 4 is a cross-fractionation chromatography analysis of a polyethylene copolymer.

$N_i$, $M_i$ and $C_1$ may be simultaneously obtained from cross-fractional chromatography, or a similar technique. FIG. 4 illustrates an exemplary cross-fractional chromatography analysis of a polyethylene copolymer.

Figure 5:
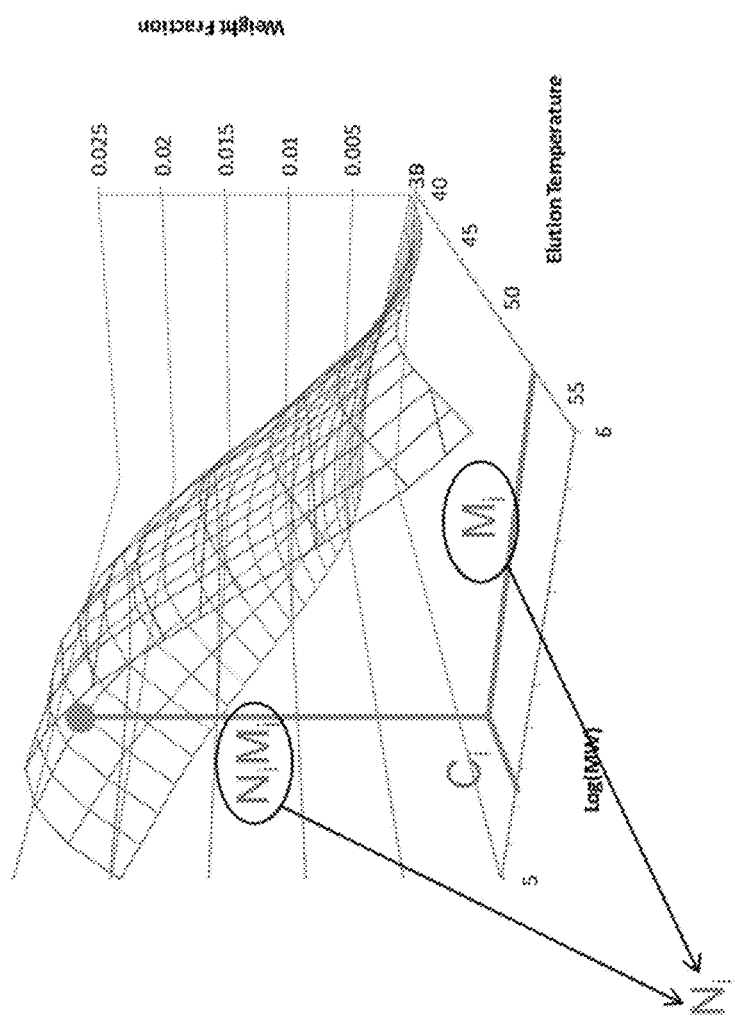
FIG. 5 is a section of a cross-fractionation chromatography analysis.

FIG. 5 illustrates a section of CFC data illustrating how $N_i$, $M_i$ and $C_1$ may be directly obtained.

Using the above obtained parameters it is useful now to assess the relative distribution of comonomer in copolymer chains of different molecular weight, that is, of different chain lengths.

Figure 6:
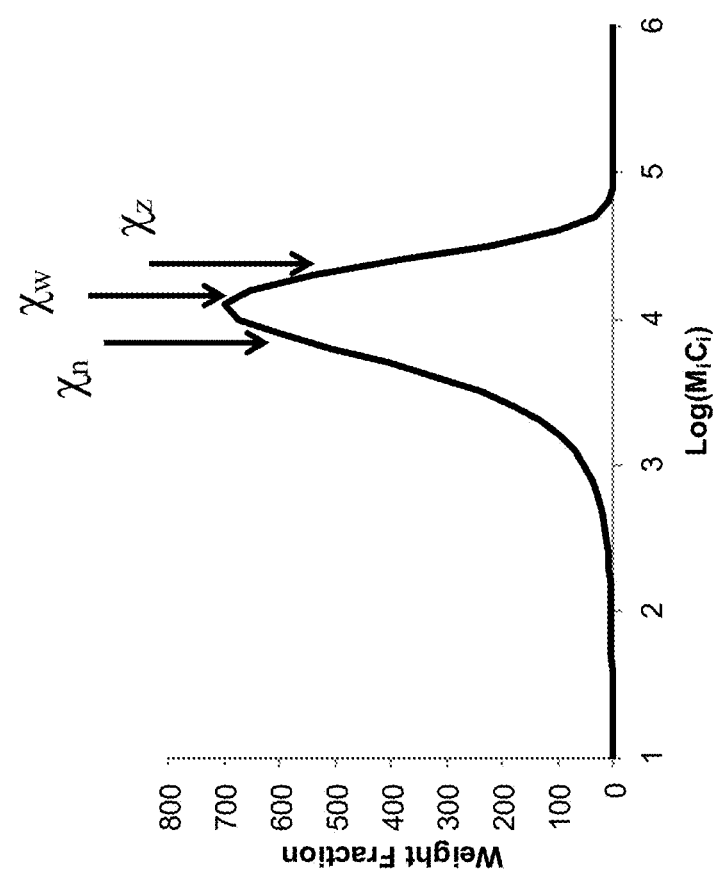
FIG. 6 illustrates a plot of weighted composition distribution (WCD).

Referring now to FIG. 6, this illustrates a weighted composition distribution (WCD) and the calculation of weighted composition distribution indices.

By replacement of $M_i$ with $M_iC_1$ in the $M_n$, $M_w$ and $M_z$ equations above, the following weighted composition distribution indices may be obtained $$\chi_n = \Sigma N_i (M_i C_i) / \Sigma N_i$$

$$\chi_w = \Sigma N_i (M_i C_i)^2 / \Sigma N_i (M_i C_i)$$

$$\chi_z = \Sigma N_i (M_i C_i)^3 / \Sigma N_i (M_i C_i)^2$$

From these, a Comonomer Partitioning Index (CPI) may be obtained:

CPI=$\chi_w/\chi_n$

Referring to FIG. 6, $\chi_n$=8,500, $\chi_w$=18,000 and =27,000 and therefore CPI=$\chi_w/\chi_n$=2.12.

Summarising the above, for a polyethylene copolymer three indices are now available: Polydispersity Index (PDI) which measures molecular weight breadth and is given by:

PDI=$M_w/M_n$ $$M_n = \Sigma N_i M_i / \Sigma N_i$$

$$M_w = \Sigma N_i M_i^2 / \Sigma N_i M_i$$

Comonomer Dispersity Index (CDI) which measures composition breadth:

$$CDI = C_{w+1} / C_w$$

$$C_w = \Sigma N_i M_i C_i / \Sigma N_i M_i$$

$$C_{w+1} = \Sigma N_i M_i C_i^2 / \Sigma N_i M_i C_1$$

Comonomer Partitioning Index (CPI) measures distribution of comonomer by polymer chain length:

$$CPI = \chi_w / \chi_n$$

$$\chi_n = \Sigma N_i (M_i C_i) / \Sigma N_i$$

$$\chi_w = \Sigma N_i (M_i C_i)^2 / \Sigma N_i (M_i C_i)$$

Using these three indices the comonomer partitioning tendency (ξ), which is a measure of the extent of comonomer preference for longer chains may be obtained by the following equation:

$$\xi = \frac{CPI}{PDI \times CDI} \quad (1)$$

Copolymers having a relatively high comonomer partitioning tendency (CPT) have a tendency to have comonomer in the high molecular weight chains.

Turning now to several exemplary embodiments. Simulations were performed using an Excel® spreadsheet and the Stockmayer equation. The Stockmayer equation was first reported in J Chem. Phys. 13, 199 (1945), and it has been used to simulate polymer molecular weight and composition distributions, see, for example, Macromol. Symp. 2009, 285, 81-89.

Figure 7:
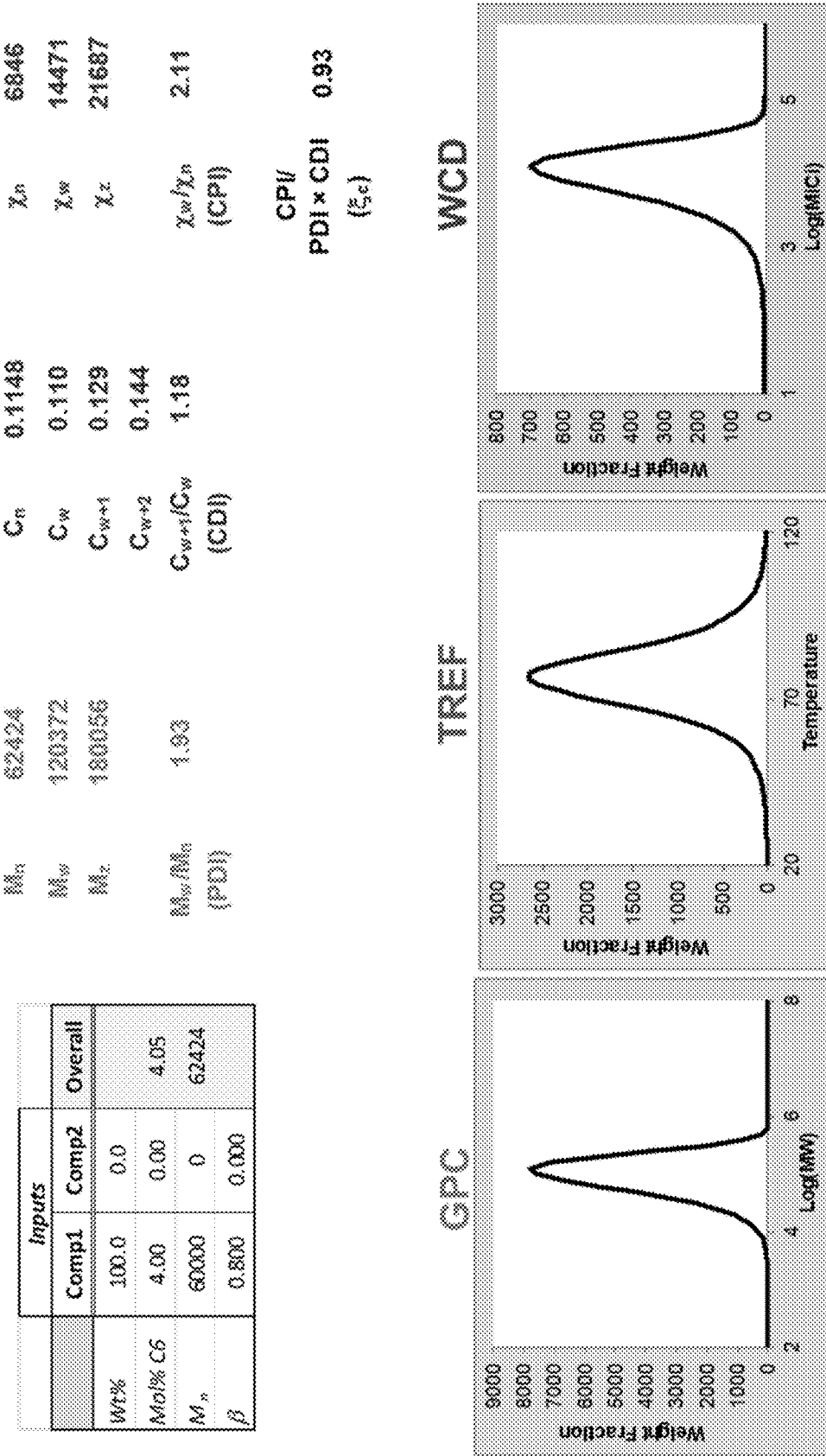
FIGS. 7 to 11 illustrate simulated GPC, TREF and WCD for various polyethylene copolymers.

FIG. 7 illustrates simulated GPC, TREF and weighted composition distribution (WCD) of a polyethylene copolymer having a relatively narrow polydispersity and relatively narrow composition distribution. The table in FIG. 7 contains the simulation input data, in this case a single ethylene-1-hexene copolymer having 4 mol % 1-hexene content, and a $M_n$ of 60,000 Daltons. ß is a fitting factor that affects the breadth of the elution profile (in TREF, for example). Physically, it is related to the catalyst reactivity ratio, which influences the statistics of distribution of comonomers along a polymer chain. The calculations provide PDI (1.93), CDI (1.18) and CPI (2.11). From these the comonomer partitioning tendency (ξ) may be calculated to be 0.93. Ideally the PDI would be 2.0, but there is some loss of fidelity between simulation and metrics calculations. However, this does not influence the significance of the results and the usefulness of the comparisons to be now described. The copolymer has a relatively narrow composition distribution (CDI) of 1.18 and a narrow weighted composition distribution (WCD) of 0.93. Note that WCD is a mathematical construct, in contrast to the GPC and TREF analyses which are obtainable by direct experimental measurement.

Figure 8:
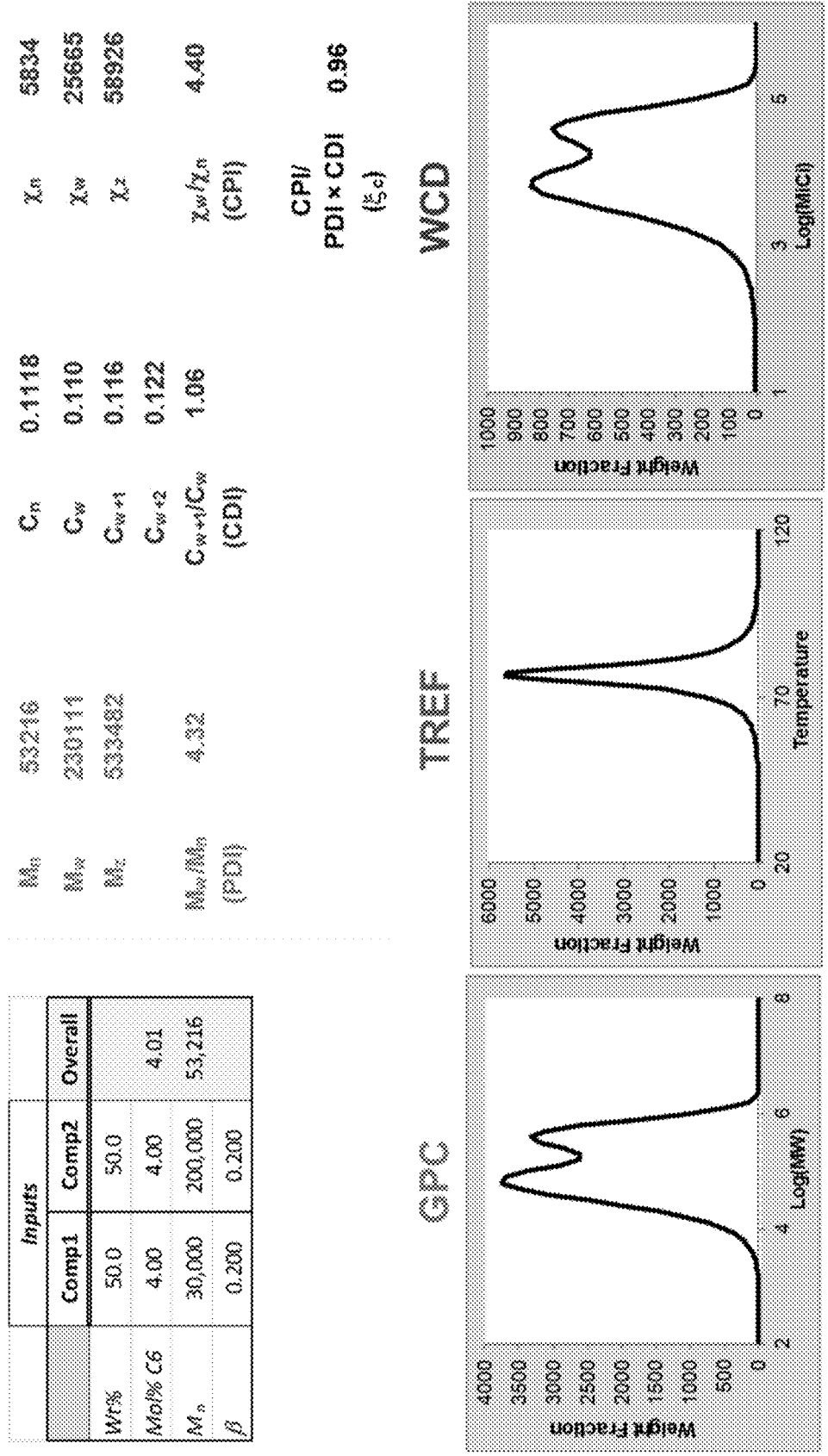

FIG. 8 illustrates simulated GPC, TREF and WCD for a polyethylene copolymer having a relatively broad polydispersity but a relatively narrow composition distribution. The simulation is based on two copolymer components each having 4 mol % 1-hexene content, but having different $M_n$ of 30,000 and 200,000 Daltons. The calculations provide PDI (4.32), CDI (1.06) and CPI (4.40). From these the comonomer partitioning tendency (ξ) may be calculated to be 0.96.

Figure 9:
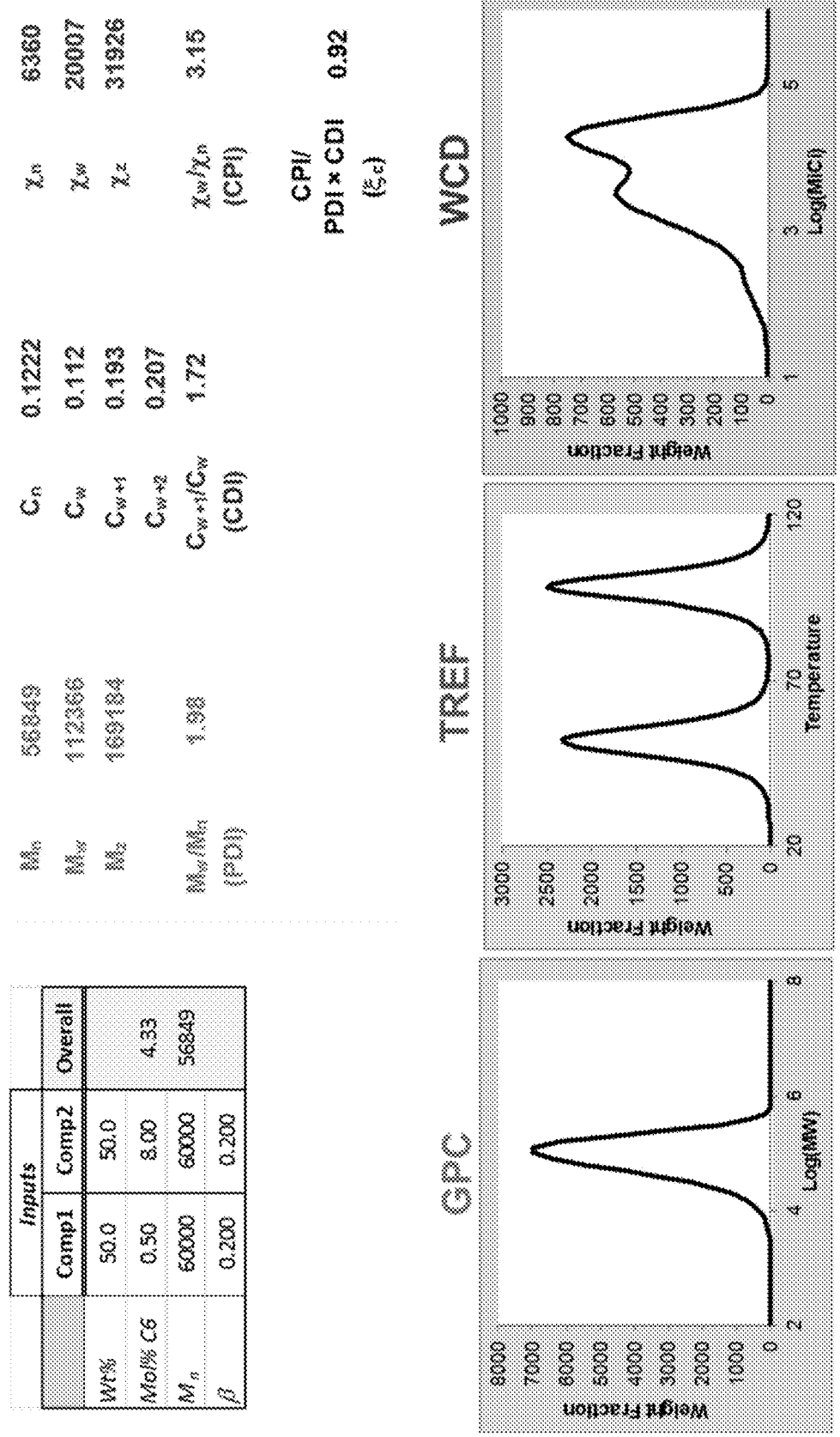

FIG. 9 illustrates simulated GPC, TREF and WCD for a polyethylene copolymer having a relatively narrow polydispersity, but a relatively broad composition distribution. The simulation is based on two copolymer components each having a $M_n$ of 60,000 Daltons. The first copolymer component has 0.5 mol % 1-hexene content and the second component has 8.0 mol % 1-hexene content. The calculations provide PDI (1.98), CDI (1.72) and CPI (3.15). From these the comonomer partitioning tendency (ξ) may be calculated to be 0.92.

Figure 10:
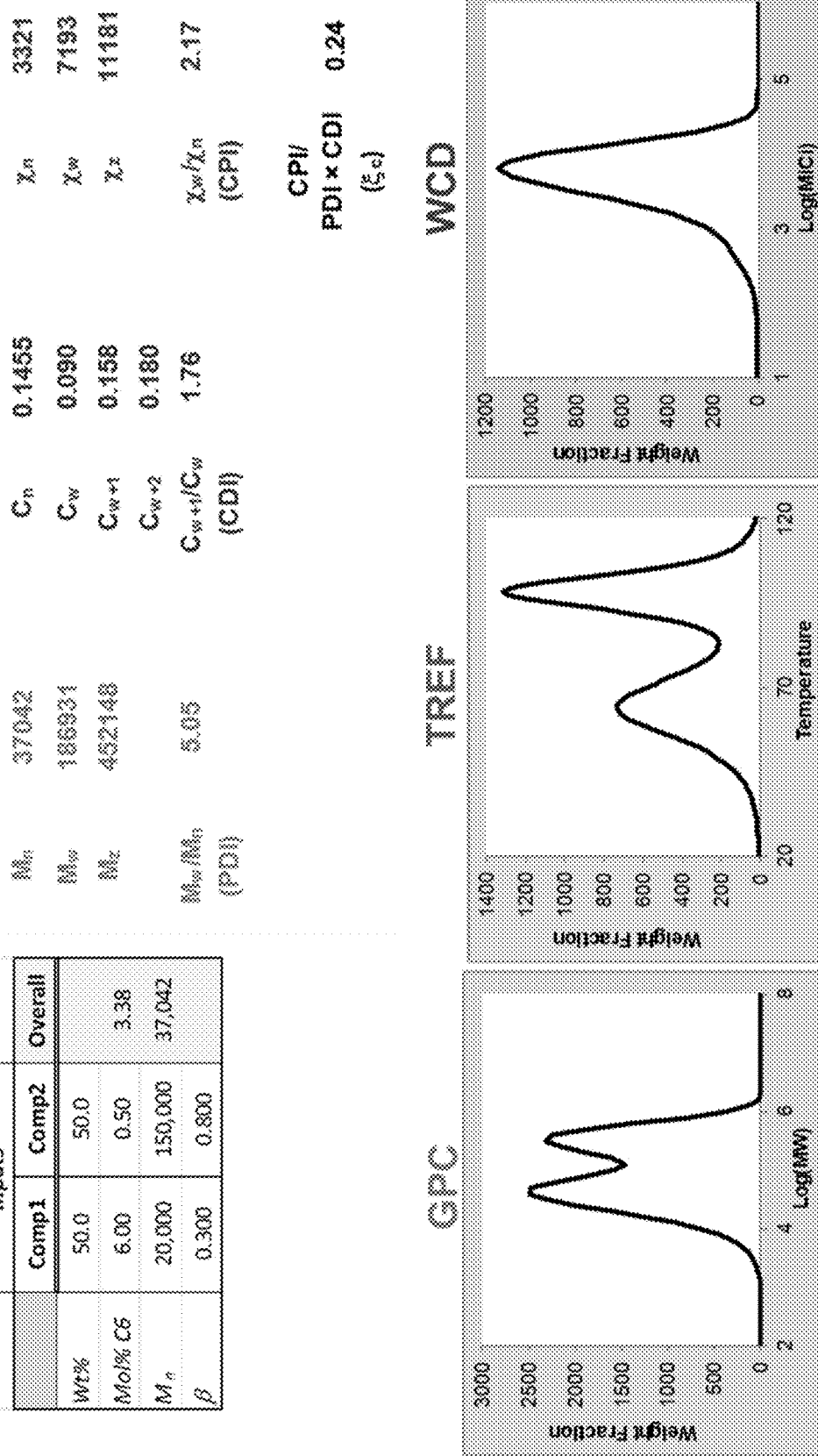

FIG. 10 illustrates a simulated polyethylene copolymer having the type of comonomer distribution expected for a Ziegler-Natta (ZN) catalyst. The simulation is performed using a low molecular weight component having a relatively high 1-hexene content (6.00 mol %) and a high molecular weight component having a relatively low 1-hexene content (0.50 mol %). The calculations provide PDI (5.05), CDI (1.76) and CPI (2.17). From these the comonomer partitioning tendency (ξ) may be calculated to be 0.24.

Comparing the comonomer partitioning tendency of the ZN type copolymer with the simulations described in FIGS. 7-9 indicates the parameter to be much lower. That is, there is a much lower propensity for comonomer to be incorporated into the higher molecular weight polymer chains.

Figure 11:
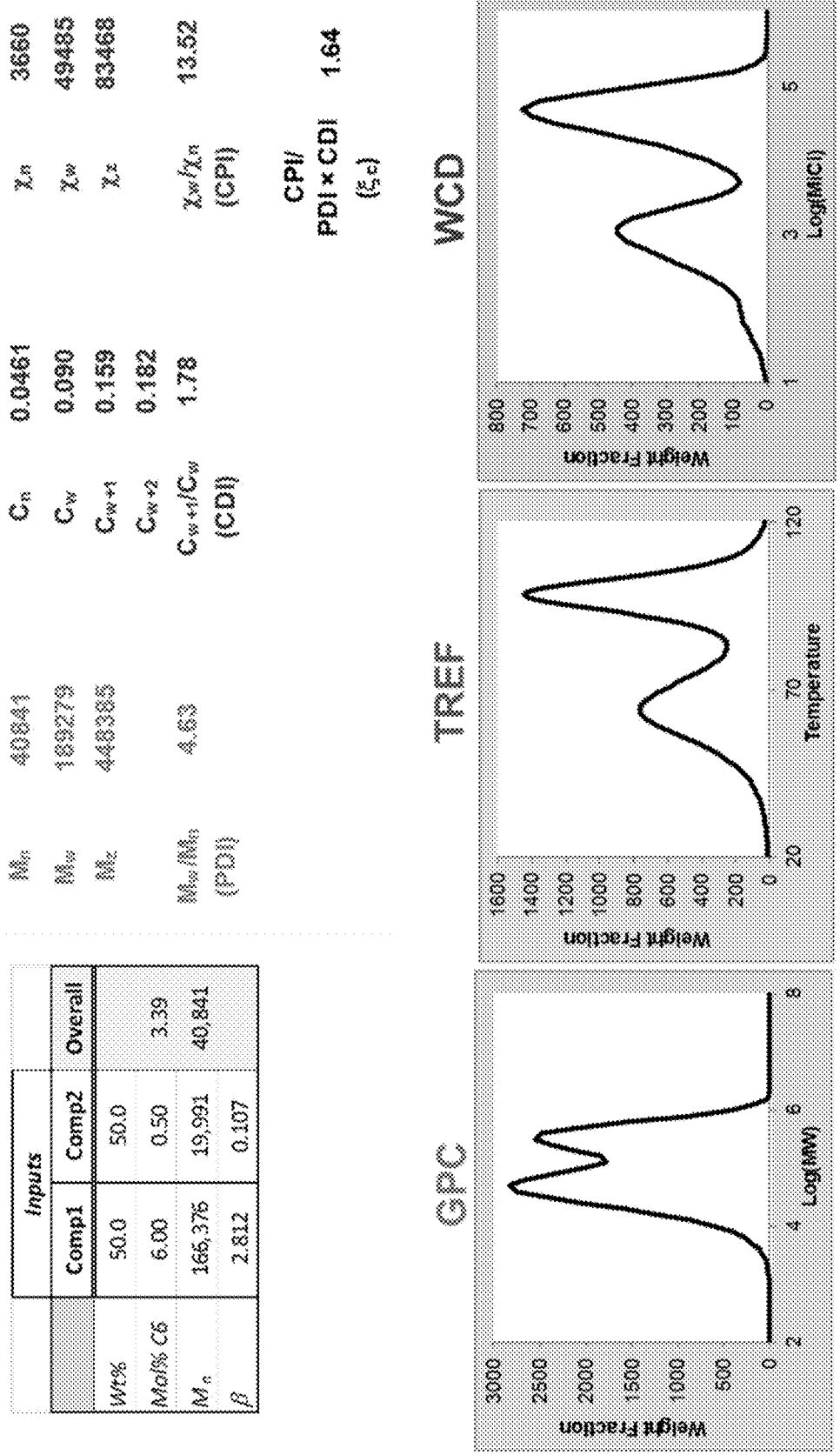

FIG. 11 illustrates a simulated polyethylene copolymer having the type of comonomer distribution expected for a BOCD type material. The simulation is performed using a low molecular weight component having a relatively low 1-hexene content (0.50 mol %) and a high molecular weight component having a relatively high 1-hexene content (6.00 mol %). The calculations provide PDI (4.63), CDI (1.78) and CPI (13.52). From these the comonomer partitioning tendency (ξ) may be calculated to be 1.64.

Figure 12:
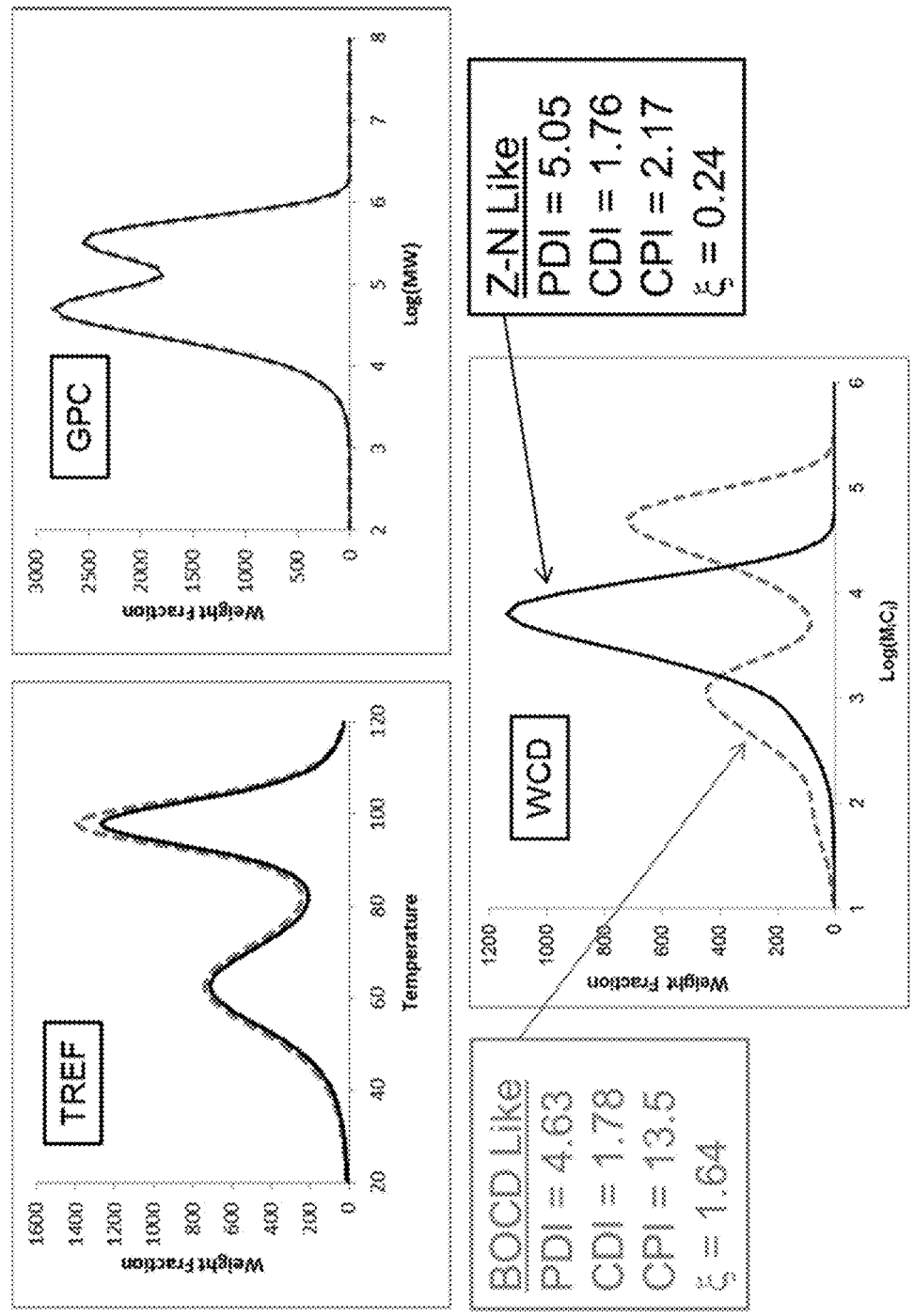
FIG. 12 illustrates simulated GPC, TREF and WCD for 'ZN like' and 'BOCD like' polyethylene copolymers.

FIG. 12 compares the results of the ZN and BOCD simulations. The TREF and MWD curves for each of the copolymers are very similar, effectively overlapping, in fact completely overlapping in the case of MWD. However the weighted composition distributions are entirely different. The BOCD simulation shows a high preference for comonomer in the high molecular weight polymer chains. Also, the comonomer partitioning index (CPI) and comonomer partitioning tendency are very different. Thus, WCD plots and CPI values are useful for distinguishing these polymers, whereas GPC and TREF are not.

FIG. 13 shows a Table which collects the various parameters for the simulated polymers described above.

Figure 14:
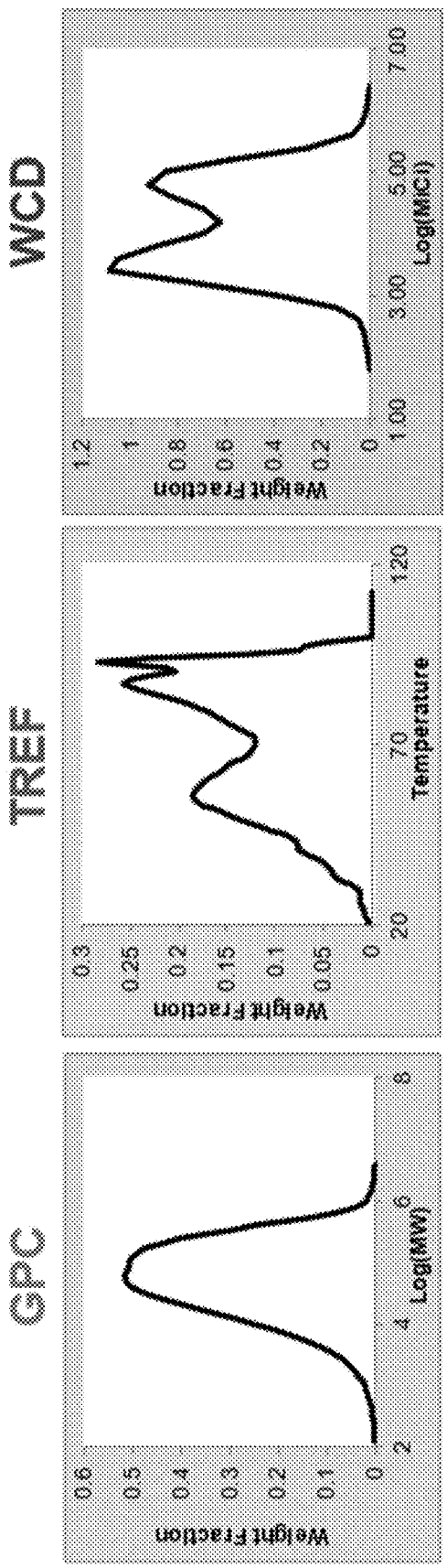
FIG. 14 shows data on a polyethylene copolymer produced with a catalyst composition according to the present disclosure.

Turning now to an example based on experimental data, FIG. 14 illustrates molecular weight and compositional data for a polyethylene copolymer made with a catalyst composition comprising the hafnium catalyst compound and zirconium catalyst compound shown below (reference is also made to entry 12 in Table 3)

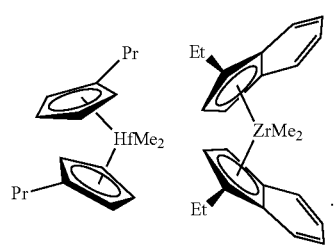

The copolymer has density 0.920 g/cm³ and melt index ($I_2$) 0.835. The PDI is 7.84, the CDI is 1.32 and the CPI 14.26. The comonomer partitioning tendency is 1.379. Accordingly, this catalyst composition has a high proclivity to build comonomer into the high molecular weight chains.

Table 1 summarizes various parameters and metrics that may be derived from cross-fractionation chromatography, or similar analyses, of a polyethylene copolymer.

TABLE 1

| Symbol | Equation | Name |
|---|---|---|
| $M_n$ | $\Sigma N_i M_i / \Sigma N_i$ | Number-average MW |
| $M_w$ | $\Sigma N_i M_i^2 / \Sigma N_i M_i$ | Weight-average MW |
| $M_z$ | $\Sigma N_i M_i^3 / \Sigma N_i M_i^2$ | z-average MW |
| $C_n$ | $\Sigma N_i C_i / \Sigma N_i$ | Number-average comonomer fraction |
| $C_w$ | $\Sigma N_i M_i C_i / \Sigma N_i M_i$ | Weight-average comonomer fraction |
| $C_{w+1}$ | $\Sigma N_i M_i C_i^2 / \Sigma N_i M_i C_i$ | |
| $C_{w+2}$ | $\Sigma N_i M_i C_i^3 / \Sigma N_i M_i C_i^2$ | |
| $\chi_n$ | $\Sigma N_i M_i C_i / \Sigma Ni$ | Number-average comonomer partition |
| $\chi_w$ | $\Sigma Ni(M_i C_i)^2 / \Sigma N_i M_i C_i$ | Weight-average comonomer partition |
| $\chi_z$ | $\Sigma Ni(M_i C_i)^3 / \Sigma Ni(M_i C_i)^2$ | z-average comonomer partition |
| $E_n$ | $\Sigma N_i E_i / \Sigma N_i$ | Number-average ethylene fraction |
| $E_w$ | $\Sigma N_i M_i E_i / \Sigma N_i M_i$ | Weight-average ethylene fraction |
| $E_{w+1}$ | $\Sigma N_i M_i E_i^2 / \Sigma N_i M_i E_i$ | |
| $E_{w+2}$ | $\Sigma N_i M_i E_i^3 / \Sigma N_i M_i E_i^2$ | |
| $\varepsilon_n$ | $\Sigma N_i M_i E_i / \Sigma Ni$ | Number-average ethylene partition |
| $\varepsilon_w$ | $\Sigma Ni(M_i E_i)^2 / \Sigma N_i M_i E_i$ | Weight-average ethylene partition |
| $\varepsilon_z$ | $\Sigma Ni(M_i E_i)^3 / \Sigma Ni(M_i E_i)^2$ | z-average ethylene partition |

Table 2 collects various indices that may be derived from the hereinbefore described parameters.

TABLE 2

| | Polydispersity Index (PDI) | Breadth of molecular weight |
|---|---|---|
| $M_w/M_n$ | | |
| $C_{w+1}/C_w$ | Comonomer Dispersity Index (CDI) | Breadth of polymer composition |
| $E_{w+1}/E_w$ | Ethylene Dispersity Index (EDI) | Breadth of polymer composition |
| $\chi_w/\chi_n$ | Comonomer Partitioning Index (CPI) | Distribution of comonomer content in chains |
| $\varepsilon_w/\varepsilon_n$ | Ethylene Partitioning Index (EPI) | Distribution of ethylene content in chains |
| CPI/(PDI * CDI) | Comonomer Partitioning Tendency (CPT) | Tendency for high-MW/low density ($\xi_c$) |
| EPI/(EDI * EDI) | Ethylene Partitioning Tendency (EPT) | Tendency for high-MW/high density ($\xi_e$) |

Catalyst Compounds

Catalyst compounds useful in the hereinbefore disclosed catalyst compositions are described hereinbelow.

Metallocene Catalyst Compounds

Metallocene catalyst compounds can include "half sandwich" and/or "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring system(s), at least a portion of which includes π-bonded systems, such as cycloalkadienyl ligands and heterocyclic analogues. The ring(s) or ring system(s) typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and $N_i$ in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the formula (I):

$$Cp^A Cp^B MX_n \qquad (I)$$

in which M is as described above; each X is chemically bonded to M; each Cp group is chemically bonded to M; and n is 0 or an integer from 1 to 4, and either 1 or 2 in a particular exemplary embodiment.

The ligands represented by $Cp^A$ and $Cp^B$ in formula (I) can be the same or different cyclopentadienyl ligands or ligands isolobal to cyclopentadienyl, either or both of which can contain heteroatoms and either or both of which can be substituted by a group R. In at least one specific embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in structure (I) as well as ring substituents in structures Va-d, discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like.

As used herein, and in the claims, hydrocarbyl substituents, or groups, are made up of between 1 and 100 or more carbon atoms, the remainder being hydrogen. Non-limiting examples of hydrocarbyl substituents include linear or branched or cyclic: alkyl radicals; alkenyl radicals; alkynyl radicals; cycloalkyl radicals; aryl radicals; alkylene radicals, or a combination thereof. Non-limiting examples include methyl, ethyl, propyl, butyl, pentyl, hexyl, cyclopentyl, cyclohexyl; olefinically unsaturated substituents including vinyl-terminated ligands (for example but-3-enyl, prop-2-enyl, hex-5-enyl and the like), benzyl or phenyl groups and the like, including all their isomers, for example tertiary butyl, isopropyl, and the like.

As used herein, and in the claims, substituted hydrocarbyl substituents, or groups, are made up of between 1 and 100 or more carbon atoms, the remainder being hydrogen, fluorine, chlorine, bromine, iodine, oxygen, sulfur, nitrogen, phosphorous, boron, silicon, germanium or tin atoms or other atom systems tolerant of olefin polymerization systems. Substituted hydrocarbyl substituents are carbon based radicals. Non-limiting examples of substituted hydrocarbyl substituents trifluoromethyl radical, trimethylsilanemethyl (Me3SiCH 2-) radicals.

As used herein, and in the claims, heteroatom substituents, or groups, are fluorine, chlorine, bromine, iodine, oxygen, sulfur, nitrogen, phosphorous, boron, silicon, germanium or tin based radicals. They may be the heteroatom atom by itself. Further, heteroatom substituents include organometalloid radicals. Non-limiting examples of heteroatom substituents include chloro radicals, fluoro radicals, methoxy radicals, diphenyl amino radicals, thioalkyls, thioalkenyls, trimethylsilyl radicals, dimethyl aluminum radicals, alkoxydihydrocarbylsilyl radicals, siloxydiydrocabylsilyl radicals, tris(perflourophenyl)boron and the like.

Other possible radicals include substituted alkyls and aryls such as, for example, fluoromethyl, fluoroethyl, difluoroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R such as 1-butanyl can form a bonding association to the element M.

Each X in the formula (I) above and for the formula/structures (II) through (Va-d) below is independently selected from the group consisting of: any leaving group, in one exemplary embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls), in yet a more particular exemplary embodiment; and fluoride, in yet a more particular exemplary embodiment.

Other non-limiting examples of X groups include amines, phosphines, ethers, carboxylates, dienes, hydrocarbon radicals having from 1 to 20 carbon atoms, fluorinated hydrocarbon radicals (e.g., $-C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals and the like. In one exemplary embodiment, two or more X's form a part of a fused ring or ring system. In at least one specific embodiment, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of formula (I) where $Cp^A$ and $Cp^B$ are bridged to each other by at least one bridging group, (A), such that the structure is represented by formula (II):

$$Cp^A(A)Cp^BMX_n \qquad (II)$$

These bridged compounds represented by formula (II) are known as "bridged metallocenes." The elements $Cp^A$, $Cp^B$, M, X and n in structure (II) are as defined above for formula (I); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In at least one specific embodiment, the bridging group (A) can also include substituent groups R as defined above (for formula (I)) including halogen radicals and iron. In at least one specific embodiment, the bridging group (A) can be represented by $C_1$ to $C_6$ alkylenes, substituted $C_1$ to $C_6$ alkylenes, oxygen, sulfur, $R'_2C=$, $R'_2Si=$, $=Si(R')_2Si(R'_2)=$, $R'_2Ge=$, and $R'P=$, where "=" represents two chemical bonds, R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In at least one specific embodiment, the bridged metallocene catalyst compound of formula (II) includes two or more bridging groups (A). In one or more embodiments, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls include from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl, and the corresponding moieties where the Si atom is replaced by a Ge or a C atom; as well as dimethylsilyl, diethylsilyl, dimethylgermyl and diethylgermyl. The bridging group (A) can also include —Si(hydrocarbyl)2-O-(hydrocarbyl)2Si—Si(substitutedhydrocarbyl)2-O-(substitutedhydrocarbyl)2Si— groups and the like such as —SiMe2-O—SiMe2- and —SiPh2-O—SiPh2-.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N, and O. Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be cis-, trans-, or a combination thereof.

The cyclic bridging groups (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular exemplary embodiment) such as, for example, cyclopentyl, cyclohexyl and phenyl. Moreover, these ring structures can themselves be fused such as, for example, in the case of a naphthyl group. Moreover, these (optionally fused) ring structures can carry one or more substituents. Illustrative, non-limiting examples of these substituents are hydrocarbyl (particularly alkyl) groups and halogen atoms. The ligands $Cp^A$ and $Cp^B$ of formula (I) and (II) can be different from each other. The ligands $Cp^A$ and $Cp^B$ of formula (I) and (II) can be the same. The metallocene catalyst compound can include bridged mono-ligand metallocene compounds (e.g., mono cyclopentadienyl catalyst components).

It is contemplated that the metallocene catalyst components discussed and described above include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso isomer does not, itself, constitute at least two different bridged, metallocene catalyst components.

As noted above, the amount of the transition metal component of the one or more metallocene catalyst compounds in the catalyst system can range from a low of about 0.0.01 wt. %, about 0.2 wt %, about 3 wt. %, about 0.5 wt. %, or about 0.7 wt. % to a high of about 1 wt. %, about 2 wt. %, about 2.5 wt. %, about 3 wt. %, about 3.5 wt. %, or about 4 wt. %, based on the total weight of the catalyst system.

The "metallocene catalyst compound" can include any combination of any "embodiment" discussed and described herein. For example, the metallocene catalyst compound can include, but is not limited to, bis(n-propylcyclopentadienyl) hafnium $(CH_3)_2$, bis(n-propylcyclopentadienyl) hafnium $F_2$, bis(n-propylcyclopentadienyl) hafnium $Cl_2$, or bis(n-butyl, methyl cyclopentadienyl) zirconium $Cl_2$, or any combination thereof.

Other metallocene catalyst compounds that may be used are supported constrained geometry catalysts (sCGC) that include (a) an ionic complex, (b) a transition metal compound, (c) an organometal compound, and (d) a support material. Such sCGC catalysts are described in PCT Publication WO2011/017092. In some embodiments, the sCGC catalyst may include a borate ion. The borate anion is represented by the formula $[BQ_{4-z'}(G_q(T-H)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to M' and r groups (T-H); q is an integer, 0 or 1; the group (T-H) is a radical wherein T includes O, S, NR, or PR, the O, S, N or P atom of which is bonded to hydrogen atom H, wherein R is a hydrocarbyl radical, a trihydrocarbylsilyl radical, a trihydrocarbyl germyl radical or hydrogen; r is an integer from 1 to 3; and d is 1. Alternatively the borate ion may be representative by the formula $[BQ_{4-z}(G_q(T-M^oR^C_{x-1}X^a_y)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to B and r groups (T-M°R$^C_{x-1}$X$^a_y$); q is an integer, 0 or 1; the group (T-M°R$^C_{x-1}$X$^a_y$) is a radical wherein T includes O, S, NR, or PR, the O, S, N or P atom of which is bonded to M°, wherein R is a hydrocarbyl radical, a trihydrocarbylsilyl radical, a trihydrocarbyl germyl radical or hydrogen; M° is a metal or metalloid selected from Groups 1-14 of the Periodic Table of the Elements, R$^C$ independently each occurrence is hydrogen or a group having from 1 to 80 nonhydrogen atoms which is hydrocarbyl, hydrocarbylsilyl, or hydrocarbylsilylhydrocarbyl; X$^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide; x is a nonzero integer which may range from 1 to an integer equal to the valence of M°; y is zero or a nonzero integer which may range from 1 to an integer equal to 1 less than the valence of M°; and x+y equals the valence of M°; r is an integer from 1 to 3; and d is 1. In some embodiments, the borate ion may be of the above described formulas where z' is 1 or 2, q is 1, and r is 1.

The catalyst system can include other single site catalysts such as Group 15-containing catalysts. The catalyst system can include one or more second catalysts in addition to the single site catalyst compound such as chromium-based catalysts, Ziegler-Natta catalysts, one or more additional single-site catalysts such as metallocenes or Group 15-containing catalysts, bimetallic catalysts, and mixed catalysts. The catalyst system can also include AlCl$_3$, cobalt, iron, palladium, or any combination thereof.

Examples of structures of MCN compounds that may be used in embodiments include the hafnium compound shown as formula (III), the zirconium compounds shown as formulas (IV-A-C), and bridged zirconium compounds, shown as formulas (V-A-B).

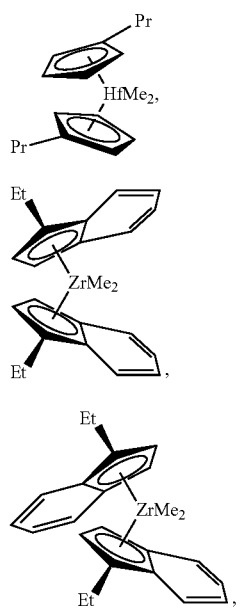

(III)

(IV-A)

(IV-B)

(IV-C)

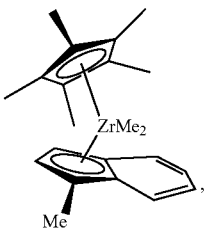

(IV-D)

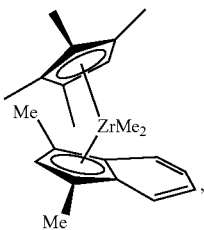

(V-A)

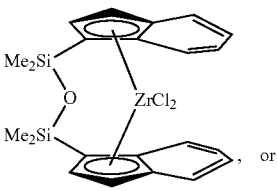

, or (V-B)

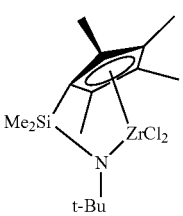

Although these compounds are shown with methyl- and chloro-groups attached to the central metal, it can be understood that these groups may be different without changing the catalyst involved. For example, each of these substituents may independently be a methyl group (Me), a chloro group (Cl), a fluoro group (F), or any number of other groups, including organic groups, or heteroatom groups. Further, these substituents will change during the reaction, as a pre-catalyst is converted to the active catalyst for the reaction. Further, any number of other substituents may be used on the ring structures, including any of the substituents described above with respect to formulas (I) and (II).

Group 15 Atom and Metal-Containing Catalyst Compounds

The catalyst system can include one or more Group 15 metal-containing catalyst compounds. The Group 15 metal-containing compound generally includes a Group 3 to 14 metal atom, a Group 3 to 7 metal atom, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a C$_1$ to C$_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with formulas (VI) or (VII):

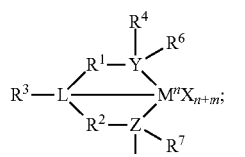

(VI)

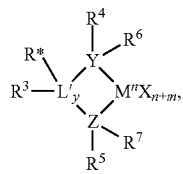

(VII)

in which M is a Group 3 to 12 transition metal or a Group 13 or 14 main group metal, a Group 4, 5, or 6 metal. In many embodiments, M is a Group 4 metal, such as zirconium, titanium or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl, or aralkyl group, such as a linear, branched, or cyclic $C_2$ to $C_{20}$ alkyl group, or a $C_2$ to $C_6$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent or a hydrogen, or a linear, cyclic or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic, or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by the following formula (VIII).

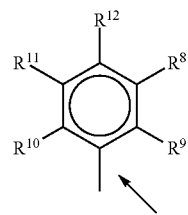

(VIII)

When $R^4$ and $R^5$ are as formula VII, $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following formula (IX).

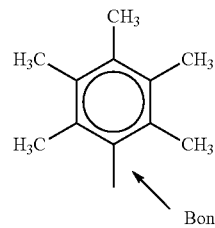

(IX)

When $R^4$ and $R^5$ follow formula IX, M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

The Group 15 metal-containing catalyst compound can be represented by the following formula (X).

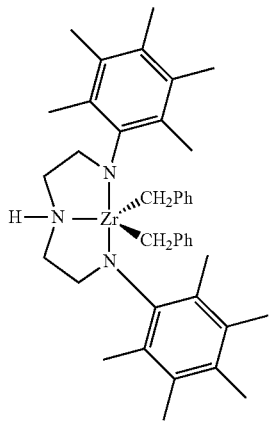

(X)

In formula X, Ph represents phenyl.

Catalyst Composition

The catalyst composition may comprise one or more catalyst compounds as hereinbefore disclosed. The catalyst compounds may be dissolved in a suitable solvent so as to provide a catalyst solution.

The catalyst composition may comprise one or more catalyst compounds as hereinbefore disclosed supported on a support or carrier. The catalyst composition comprising one or more catalyst compounds supported on a support or carrier may be in the form of a slurry or a substantially dry, free flowing powder.

The catalyst composition in the form of a slurry, may comprise one or more initial catalyst compounds, and an added solution catalyst compound that is added to the slurry. A so-called "trim-catalyst". The initial catalyst composition slurry may have no catalyst compounds. In this case, one or more solution catalysts may be added to the slurry to cause each to be supported.

Any number of combinations of catalyst compounds may be used in embodiments. For example, the catalyst composition slurry may comprise an activator and a support, or a supported activator. Further, the slurry may comprise a catalyst compound in addition to the activator and the support. As noted, the catalyst compound in the slurry may be supported.

The slurry may comprise one or more activators and supports, and one more catalyst compounds. For example, the slurry may comprise two or more activators (such as alumoxane and a modified alumoxane) and a catalyst compound, or the slurry may comprise a supported activator and more than one catalyst compounds. In one embodiment, the slurry comprises a support, an activator, and one catalyst compound. In another embodiment the slurry comprises a support, an activator and two catalyst compounds. In another embodiment the slurry comprises a support, an activator and two different catalyst compounds, which may be added to the slurry separately or in combination. The slurry, containing silica and alumoxane, may be contacted with a catalyst compound, allowed to react, and thereafter the slurry is contacted with another catalyst compound, for example, in a trim system.

The molar ratio of metal in the activator to metal in the catalyst compound in the slurry may be 1000:1 to 0.5:1, 300:1 to 1:1, or 150:1 to 1:1. The slurry can include a support material which may be any inert particulate carrier material known in the art, including, but not limited to, silica, fumed silica, alumina, clay, talc or other support materials such as disclosed below. In one embodiment, the slurry comprises silica and an activator, such as methyl aluminoxane ("MAO"), modified methyl aluminoxane ("MMAO"), as discussed further below.

One or more diluents or carriers can be used to facilitate the combination of any two or more components of the catalyst system in the slurry or in the trim catalyst solution. For example, the catalyst compound and the activator can be combined together in the presence of toluene or another non-reactive hydrocarbon or hydrocarbon mixture to provide the catalyst mixture. In addition to toluene, other suitable diluents can include, but are not limited to, ethylbenzene, xylene, pentane, hexane, heptane, octane, other hydrocarbons, or any combination thereof. The support, either dry or mixed with toluene may then be added to the catalyst mixture or the catalyst/activator mixture may be added to the support.

Catalyst Solutions

The catalyst solution may include only catalyst compounds or may include activators in addition to the catalyst compounds. The liquid solvent may be an alkane, such as a $C_5$ to $C_{30}$ alkane, or a $C_5$ to $C_{10}$ alkane. Cyclic alkanes such as cyclohexane and aromatic compounds such as toluene may also be used. In addition, mineral oil may be used as a solvent. The solution employed should be liquid under the conditions of polymerization and relatively inert. The catalyst solution may be used directly in a polymerization reaction, for example, in a solution polymerization reaction.

The catalyst solution used in the trim process can be prepared by dissolving the catalyst compound and optional activators in a liquid solvent. In one embodiment, the liquid utilized in the catalyst compound solution is different from the diluent used in the catalyst component slurry. In another embodiment, the liquid utilized in the catalyst compound solution is the same as the diluent used in the catalyst component solution.

If the catalyst solution includes both activator and catalyst compound, the ratio of metal in the activator to metal in the catalyst compound in the solution may be 1000:1 to 0.5:1, 300:1 to 1:1, or 150:1 to 1:1. In certain cases, it may be advantageous to have an excess of catalyst compound such that the ratio is <1:1, for example, 1:1 to 0.5:1 or 1:1 to 0.1:1 or 1:1 to 0.01. In various embodiments, the activator and catalyst compound is present in the solution at up to about 90 wt. %, at up to about 50 wt. %, at up to about 20 wt. %, preferably at up to about 10 wt. %, at up to about 5 wt. %, at less than 1 wt. %, or between 100 ppm and 1 wt. %, based upon the weight of the solvent and the activator or catalyst compound.

The catalyst composition solution can comprise any one of the soluble catalyst compounds described in the catalyst section herein. As the catalyst is dissolved in the solution, a higher solubility is desirable. Accordingly, the catalyst compound in the catalyst composition solution may often include a metallocene, which may have higher solubility than other catalysts.

In the polymerization process described below, any of the above described catalyst component containing solutions may be utilized or may be combined with any of the catalyst component containing slurry/slurries described above. In addition, more than one catalyst component solution may be utilized.

Catalyst Supports

As used herein, the terms "support" and "carrier" are used interchangeably and refer to any support material, including a porous support material, such as talc, inorganic oxides, and inorganic chlorides. The one or more single site catalyst compounds of the slurry can be supported on the same or separate supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. For example, the single site catalyst compound can contain a polymer bound ligand. The single site catalyst compounds of the slurry can be spray dried. The support used with the single site catalyst compound can be functionalized.

The support can be or include one or more inorganic oxides, for example, of Group 2, 3, 4, 5, 13, or 14 elements. The inorganic oxide can include, but is not limited to silica, alumina, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include alumina, silica, or a combination thereof. In one embodiment described herein, the support is silica.

Suitable commercially available silica supports can include, but are not limited to, ES757, ES70, and ES70W available from PQ Corporation. Suitable commercially available silica-alumina supports can include, but are not limited to, SIRAL® 1, SIRAL® 5, SIRAL® 10, SIRAL® 20, SIRAL® 28M, SIRAL® 30, and SIRAL® 40, available from SASOL®. Generally, catalyst supports comprising silica gels with activators, such as methylaluminoxanes (MAOs), are used in the trim systems described, since these supports may function better for co-supporting solution carried catalysts. Suitable supports may also be selected from the Cab-o-Sil® materials available from Cabot Corporation and silica materials available from the Grace division of W.R. Grace & Company.

Catalyst supports may also include polymers that are covalently bonded to a ligand on the catalyst. For example, two or more catalyst molecules may be bonded to a single polyolefin chain.

Catalyst Activators

As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst".

For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-($CF_3$)$_2$phenyl)borate, Triphenylcarbenium tetrakis(3,5-($CF_3$)$_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

It is recognized that these activators may or may not bind directly to the support surface or may be modified to allow them to be bound to a support surface while still maintaining their compatability with the polymerization system. Such tethering agents may be derived from groups that are reactive with surface hydroxyl species. Non-limiting examples of reactive functional groups that can be used to create tethers include aluminum halides, aluminum hydrides, aluminum alkyls, aluminum aryls, aluminum alkoxides, electrophilic silicon reagents, alkoxy silanes, amino silanes, boranes.

Aluminoxanes can be described as oligomeric aluminum compounds having —Al(R)—O-subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes.

In one or more embodiments, a visually clear MAO can be used. For example, a cloudy or gelled aluminoxane can be filtered to produce a clear aluminoxane or clear aluminoxane can be decanted from a cloudy aluminoxane solution. In another embodiment, a cloudy and/or gelled aluminoxane can be used. Another aluminoxane can include a modified methyl aluminoxane ("MMAO") type 3A (commercially available from Akzo Chemicals, Inc. under the trade name Modified Methylaluminoxane type 3A, discussed and described in U.S. Pat. No. 5,041,584). A suitable source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Continuity Additive/Static Control Agents

In gas-phase polyethylene production processes, as disclosed herein, it may be desirable to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMA-MINE® (available from Crompton Corporation) or ATMER® (available from ICI Americas Inc.) family of products).

Other useful continuity additives include ethyleneimine additives useful in embodiments disclosed herein may include polyethyleneimines having the following general formula:

in which n may be from about 10 to about 10,000. The polyethyleneimines may be linear, branched, or hyper-branched (e.g., forming dendritic or arborescent polymer structures). They can be a homopolymer or copolymer of ethyleneimine or mixtures thereof (referred to as polyethyleneimine(s) hereafter). Although linear polymers represented by the chemical formula —[CH$_2$—CH$_2$—NH]— may be used as the polyethyleneimine, materials having primary, secondary, and tertiary branches can also be used. Commercial polyethyleneimine can be a compound having branches of the ethyleneimine polymer. Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF. Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt. % to about 50 wt. % or about 10 wt. % to about 40 wt. %, or about 15 wt. % to about 30 wt. %.

The continuity additive(s) or static control agent(s) may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

Polymerization Processes

The catalyst compositions disclosed herein can be used to polymerize one or more olefins to provide one or more polymer products therefrom. Any suitable polymerization process can be used, including, but not limited to, high pressure, solution, slurry, and/or gas phase polymerization processes. In embodiments that use other techniques besides gas phase polymerization, modifications to the catalyst addition system may be utilized. For example, a trim system may be used to feed catalyst to a loop slurry reactor for polyethylene copolymer production. In other embodiments catalyst solutions may be used to feed one or more catalysts to a solution polymerization process.

The term "polyethylene copolymer" refers to a polymer having at least 50 wt. % ethylene-derived units. In various embodiments, the polyethylene copolymer can have at least 70 wt. % ethylene-derived units, at least 80 wt. % ethylene-derived units, at least 90 wt. % ethylene-derived units, or at least 95 wt. % ethylene-derived units, or more. The polyethylene copolymer may be a terpolymer, having one or more other monomeric units. As described herein, a polyethylene copolymer can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Suitable comonomers may include one or more alpha-olefins. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

Other olefins useful in the present process include ethylenically unsaturated monomers, diolefins having 4 to 18 carbon atoms, conjugated or nonconjugated dienes, polyenes, vinyl monomers and cyclic olefins. Useful monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In an illustrative embodiment of the present process, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the present process, ethylene or propylene is polymerized with at least two different comonomers, optionally one of which may be a diene, to form a terpolymer.

A gas phase fluidized bed reactor may include a reaction zone and a velocity reduction zone. The reaction zone may include a bed that includes growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow can be readily determined by experimentation. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone may be passed to the velocity reduction zone where entrained particles are removed, for example, by slowing and falling back to the reaction zone. If desired, finer entrained particles and dust can be removed in a separation system, such as a cyclone and/or fines filter. The gas may be passed through a heat exchanger where at least a portion of the heat of polymerization may be removed. The gas may then be compressed in a compressor and returned to the reaction zone.

The reactor temperature of the fluid bed process can be greater than about 30° C., about 40° C., about 50° C., about 90° C., about 100° C., about 110° C., about 120° C., about 150° C., or higher. In general, the reactor temperature is operated at the highest feasible temperature taking into account the sintering temperature of the polymer product within the reactor. Preferred reactor temperatures are between 70 and 95° C. More preferred reactor temperatures are between 75 and 90° C. Thus, the upper temperature limit in one embodiment is the melting temperature of the polyethylene copolymer produced in the reactor. However, higher temperatures may result in narrower MWDs, which can be improved by the addition of metallocenes, or other catalysts, as described herein.

Hydrogen gas can be used in olefin polymerization to control the final properties of the polyolefin. Using certain catalyst systems, increasing concentrations (partial pressures) of hydrogen can increase the flow index (FI) of the polyethylene copolymer generated. The flow index can thus be influenced by the hydrogen concentration. The amount of hydrogen in the polymerization can be expressed as a mole ratio relative to the total polymerizable monomer, for example, ethylene, or a blend of ethylene and 1-hexene or propylene.

The amount of hydrogen used in the polymerization process can be an amount necessary to achieve the desired flow index of the final polyolefin resin. For example, the mole ratio of hydrogen to total monomer ($H_2$:monomer) can be greater than about 0.0001, greater than about 0.0005, or greater than about 0.001. Further, the mole ratio of hydrogen to total monomer ($H_2$:monomer) can be less than about 10, less than about 5, less than about 3, and less than about 0.10. A desirable range for the mole ratio of hydrogen to monomer can include any combination of any upper mole ratio limit with any lower mole ratio limit described herein. Expressed another way, the amount of hydrogen in the reactor at any time can range to up to about 5,000 ppm, up to about 4,000 ppm in another embodiment, up to about 3,000 ppm, or between about 50 ppm and 5,000 ppm, or between about 50 ppm and 2,000 ppm in another embodiment. The amount of hydrogen in the reactor can range from a low of about 1 ppm, about 50 ppm, or about 100 ppm to a high of about 400 ppm, about 800 ppm, about 1,000 ppm, about 1,500 ppm, or about 2,000 ppm. Further, the ratio of hydrogen to total monomer ($H_2$:monomer) can be about 0.00001:1 to about 2:1, about 0.005:1 to about 1.5:1, or about 0.0001:1 to about 1:1. The one or more reactor pressures in a gas phase process (either single stage or two or more stages) can vary from 690 kPa (100 psig) to 3,448 kPa (500 psig), in the range from 1,379 kPa (200 psig) to 2,759 kPa (400 psig), or in the range from 1,724 kPa (250 psig) to 2,414 kPa (350 psig).

The gas phase reactor can be capable of producing from about 10 kg of polymer per hour (25 lbs/hr) to about 90,900 kg/hr (200,000 lbs/hr), or greater, and greater than about 455 kg/hr (1,000 lbs/hr), greater than about 4,540 kg/hr (10,000 lbs/hr), greater than about 11,300 kg/hr (25,000 lbs/hr), greater than about 15,900 kg/hr (35,000 lbs/hr), and greater than about 22,700 kg/hr (50,000 lbs/hr), and from about 29,000 kg/hr (65,000 lbs/hr) to about 45,500 kg/hr (100,000 lbs/hr).

As noted, a slurry polymerization process can also be used in embodiments. A slurry polymerization process generally uses pressures in the range of from about 101 kPa (1 atmosphere) to about 5,070 kPa (50 atmospheres) or greater, and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene, comonomers, and hydrogen along with catalyst composition can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed. The slurry can be circulated in a continuous loop system.

The polyethylene copolymer may have a melt index ratio (MIR or $I_{21}/I_2$) ranging from about 5 to about 300, or from about 10 to less than about 150, or, in many embodiments, from about 15 to about 50. Flow index (FI, HLMI, or $I_{21}$ can be measured in accordance with ASTM D1238 (190° C., 21.6 kg). The melt index (MI, $I_2$) can be measured in accordance with ASTM D1238 (at 190° C., 2.16 kg weight).

The polyethylene copolymer may have a density ranging from a low of about 0.87 g/cm³, about 0.88 g/cm³, about 0.89 g/cm³, about 0.90 g/cm³, or about 0.91 g/cm³ to a high of about 0.94 g/cm³, about 0.95 g/cm³, about 0.96 g/cm³, or about 0.97 g/cm³. Density can be determined in accordance with ASTM D-792. Density is expressed as grams per cubic centimeter (g/cm³) unless otherwise noted.

The polyethylene copolymer can have a bulk density, measured in accordance with ASTM D1895 method B, of from about 0.25 g/cm³ to about 0.5 g/cm³. For example, the bulk density of the polyethylene can range from a low of about 0.30 g/cm³, about 0.32 g/cm³, or about 0.33 g/cm³ to a high of about 0.40 g/cm³, about 0.44 g/cm³, or about 0.48 g/cm³.

The polyethylene copolymer can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

EXAMPLES

It is to be understood that while the present disclosure has been described in conjunction with the specific embodiments thereof, the foregoing description is intended to illustrate and not limit the scope of the disclosure. Other aspects, advantages and modifications will be apparent to those skilled in the art to which the disclosure pertains. Therefore, the following examples are put forth so as to provide those skilled in the art with a complete disclosure and description of how to make and use the disclosed compositions, and are not intended to limit the scope of the disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All numerical values are "about" or "approximately" the indicated value, and take into account experimental error and variations that would be expected by a person having ordinary skill in the art. Further, various terms have been defined above. To the extent a term used in a claim is not defined above, it should be given the broadest definition persons in the pertinent art have given that term as reflected in at least one printed publication or issued patent.

All documents cited are herein fully incorporated by reference for all jurisdictions in which such incorporation is permitted and to the extent such disclosure is consistent with the description of the present disclosure.

Cross-fractionation chromatography (CFC) data were acquired using a CFC-2 instrument from Polymer Char, Valencia, Spain. The instrument operation and subsequent data processing (e.g., smoothing parameters, setting baselines, and defining integration limits) were performed according to the manner described in the CFC User Manual provided with the instrument or in a manner commonly used in the art. The instrument was equipped with a TREF column (stainless steel; o.d., ⅜"; length, 15 cm; packing, non-porous stainless steel micro-balls) in the first dimension and a GPC column set (3×PLgel 10 µm Mixed B column from Polymer Labs, UK) in the second dimension. Downstream from the GPC column was an infrared detector (IR4 from Polymer Char) capable of generating an absorbance signal that is proportional to the concentration of polymer in solution.

The analyte was dissolved in ortho-dichlorobenzene (concentration, 5 mg/ml) by stirring at 150° C. for 75 min. Then a 0.5 ml volume of the solution containing 2.5 mg of polymer was loaded in the center of the TREF column and the column temperature was reduced and stabilized at ca. 120° C. for 30 min. Next, the column was cooled slowly (0.2° C./min) to 30° C. (for ambient runs) or −15° C. (for cryogenic runs) to crystallize the polymer on the inert support. The low temperature was held for 10 min before injecting the soluble fraction into the GPC column. All GPC analyses were performed using ortho-dichlorobenzene solvent at 1 ml/min, a column temperature of 140° C., and in the "Overlap GPC Injections" mode. Then the subsequent higher-temperature fractions were analyzed by increasing the TREF column temperature to the fraction set-points in a stepwise manner, allowing the polymer to dissolve for 16 min ("Analysis Time"), and injecting the dissolved polymer into the GPC column for 3 min ("Elution Time").

Initially, the universal calibration method was used for approximating the molecular mass of eluting polymers. Thirteen narrow molecular-weight distribution polystyrene standards (obtained from Polymer Labs, UK) within the range of 1.5-8200 Kg/mol were used to generate a universal calibration curve. Mark-Houwink parameters were obtained from Appendix I of "Size Exclusion Chromatography" by S. Mori and H. G. Barth (Springer). For polystyrene $K=1.38\times 10^{-4}$ dl/g and $\alpha=0.7$; and for polyethylene $K=5.05\times 10-4$ dl/g and $\alpha=0.693$ were used.

To further correct for deviations due to variable injection concentrations, a polynomial correction was applied to the GPC baseline of the CFC data to fit to $M_n$, $M_w$ and $M_z$ of the analyte as determined by conventional GPC analysis. Thus, the corrected value, $\log(MW)_{corr}$ is calculated from the initial value, $\log(MW)_{orig}$, according to the equation:

$$\log(MW)_{corr}=a+b\times\log(MW)_{orig}+c\times\log(MW)_{orig}^2+d\times\log(MW)_{orig}^3$$

The values of a,b,c, and d were adjusted to minimize the value of $(\log(M_{n,corr})-\log(M_n))^2+(\log(M_{w,corr})-\log(M_w))^2+(\log(M_{z,corr})-\log(M_z))^2$. Generally, the values of a, c and d were close to zero, while b was close to one.

Numerous ethylene-1-hexene copolymers were prepared in a continuous gas phase fluidized bed polymerization process and analyzed by cross-fractionation chromatography as described above. Inventive copolymers 1-32 were prepared with catalyst compositions comprising the catalyst compounds supported on silica/methylalumoxane and as detailed in Table 3. In Table 3, 'catalyst compound' refers to the catalyst compound or compounds supported on the silica/methylalumoxane. Trim catalyst, if used, refers to a catalyst compound in solution added to the supported catalyst in-line and prior to addition to the gas phase polymerization reactor. Comparative copolymer samples were a selection of commercially available ethylene 1-hexene or ethylene 1-octene copolymers. The results in Table 3 illustrate that comonomer partitioning tendency (ξ) is an effective metric for describing the comonomer distribution of the novel copolymers and that the comonomer distributions are clearly distinguishable from any of the prior art copolymers analyzed in regard to an increased tendency for comonomer to reside in the high molecular weight polymer chains.

The catalysts referred to in Table 3 are as follows:

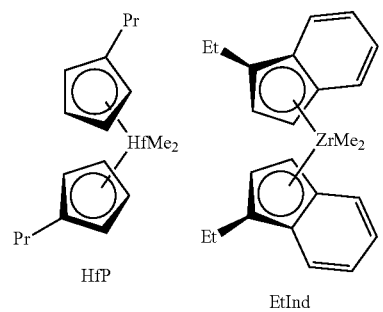

-continued

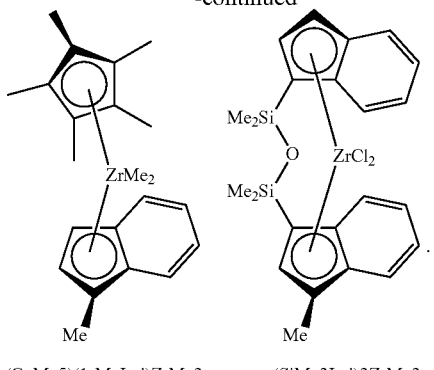

(CpMe5)(1-MeInd)ZrMe2    meso-(SiMe2Ind)2ZrMe2

What is claimed is:
1. A method for preparing a polyethylene copolymer having a comonomer partitioning tendency of greater than 1.16 by polymerizing ethylene and one or more comonomers in the presence of a catalyst composition comprising two or more of the catalyst compounds including
   i) a catalyst compound with the following formula:

$$(C_5H_aR^1_b)(C_5H_cR^2_d)HfX_2.$$

wherein, each $R^1$ is independently H, a hydrocarbyl group, a substituted hydrocarbyl group, or a heteroatom group; each $R^2$ is independently H, a hydrocarbyl group, a substituted hydrocarbyl group, or a heteroatom group; a and c are $\geq 3$; a+b=c+d=5; at least one $R^1$ and at least one $R^2$ is a hydrocarbyl or substituted hydrocarbyl group; adjacent groups $R^1$ and $R^2$ groups are optionally coupled to form a ring; and each X is independently a leaving group selected

TABLE 3

Catalyst details and properties of polyethylene copolymers

| No. | ξ | Catalyst Compound | Trim Catalyst Compound | Comon. | Density g/cm³ | I 2 dg/min | I 21/I 2 | Mn | Mw | Mz | Mw/Mn |
|---|---|---|---|---|---|---|---|---|---|---|---|
| 1 | 1.824 | HfP/Et-Ind | Et-Ind | C6 | 0.932 | 0.6448 | 49.9 | 23971 | 158611 | 647928 | 6.62 |
| 2 | 1.573 | HfP | (CpMe5)(1-MeInd)ZrMe2 | C6 | 0.932 | 1.731 | 33.1 | 18326 | 91292 | 266380 | 4.98 |
| 3 | 1.521 | HfP/Et-Ind | — | C6 | 0.921 | 1.062 | 60.5 | 7349 | 118201 | 398132 | 16.08 |
| 4 | 1.508 | HfP/Et-Ind | Et-Ind | C6 | 0.922 | 0.8761 | 58.9 | 16800 | 130502 | 402576 | 7.77 |
| 5 | 1.492 | HfP/Et-Ind | Et-Ind | C6 | 0.930 | 0.4576 | 40.6 | 26415 | 160110 | 512924 | 6.06 |
| 6 | 1.487 | HfP/Et-Ind | HfP | C6 | 0.921 | 1.0259 | 58.3 | 16532 | 123885 | 404170 | 7.49 |
| 7 | 1.437 | HfP/Et-Ind | HfP | C6 | 0.922 | 1.0562 | 48.8 | 18964 | 118750 | 348847 | 6.26 |
| 8 | 1.428 | HfP/Et-Ind | Et-Ind | C6 | 0.925 | 0.9004 | 36.1 | 28224 | 132219 | 383815 | 4.68 |
| 9 | 1.414 | HfP/Et-Ind | Et-Ind | C6 | 0.919 | 0.851 | 36.5 | 22299 | 130569 | 366472 | 5.86 |
| 10 | 1.412 | HfP | meso-O (SiMe2Ind)2ZrMe2 | C6 | 0.926 | 0.6773 | 26.6 | 26462 | 118143 | 306568 | 4.46 |
| 11 | 1.393 | HfP/Et-Ind | Et-Ind | C6 | 0.921 | 0.9395 | 48.5 | 11058 | 120583 | 355402 | 10.90 |
| 12 | 1.379 | HfP/Et-Ind | Et-Ind | C6 | 0.920 | 0.835 | 50.0 | 16505 | 129328 | 382573 | 7.84 |
| 13 | 1.379 | HfP | (CpMe5)(1-MeInd)ZrMe2 | C6 | 0.929 | 1.164 | 32.6 | 18469 | 96130 | 275760 | 5.20 |
| 14 | 1.378 | HfP/Et-Ind | Et-Ind | C6 | 0.919 | 0.7355 | 36.5 | 20704 | 133551 | 365047 | 6.45 |
| 15 | 1.370 | HfP | Et-Ind | C6 | 0.934 | 1.595 | 48.1 | 11011 | 90415 | 314785 | 8.21 |
| 16 | 1.348 | HfP/Et-Ind | Et-Ind | C6 | 0.921 | 0.8205 | 37.6 | 14155 | 132718 | 428476 | 9.38 |
| 17 | 1.334 | HfP | — | C6 | 0.930 | 1.015 | 37.0 | 14829 | 97208 | 288186 | 6.56 |
| 18 | 1.316 | HfP/Et-Ind | Et-Ind | C6 | 0.922 | 0.9237 | 35.7 | 20559 | 130055 | 377221 | 6.33 |
| 19 | 1.312 | HfP/Et-Ind | Et-Ind | C6 | 0.920 | 0.9585 | 37.2 | 11842 | 127073 | 381762 | 10.73 |
| 20 | 1.304 | HfP | Et-Ind | C6 | 0.921 | 0.2966 | 35.4 | 21038 | 136835 | 392332 | 6.50 |
| 21 | 1.301 | HfP/Et-Ind | Et-Ind | C6 | 0.920 | 0.9492 | 47.5 | 10311 | 124625 | 370695 | 12.09 |
| 22 | 1.298 | HfP | — | C6 | 0.919 | 1.133 | 26.9 | 31030 | 118183 | 287972 | 3.81 |
| 23 | 1.295 | HfP | — | C6 | 0.921 | 0.7314 | 24.8 | 27481 | 115881 | 428414 | 4.22 |
| 24 | 1.291 | HfP | — | C6 | 0.919 | 1.05 | 25.9 | 31957 | 124339 | 311483 | 3.89 |
| 25 | 1.263 | HfP | (CpMe4)(1,3Me2Ind)ZrMe2 | C6 | 0.925 | 1.035 | 25.2 | 28387 | 99809 | 242087 | 3.52 |
| 26 | 1.256 | HfP | (CpMe4)(1,3Me2Ind)ZrMe2 | C6 | 0.924 | 0.8941 | 24.0 | 32069 | 106652 | 271381 | 3.33 |
| 27 | 1.235 | HfP/Et-Ind | Et-Ind | C6 | 0.927 | 1 | 26.0 | 27476 | 135676 | 385278 | 4.94 |
| 28 | 1.222 | HfP | meso-O (SiMe2Ind)2ZrMe2 | C6 | 0.922 | 0.6067 | 23.8 | 30255 | 117800 | 281015 | 3.89 |
| 29 | 1.221 | HfP/Et-Ind | Et-Ind | C6 | 0.920 | 0.9055 | 28.7 | 22845 | 127724 | 325535 | 5.59 |
| 30 | 1.210 | HfP/Et-Ind | Et-Ind | C6 | 0.917 | 1 | 25.9 | 23317 | 134687 | 337419 | 5.78 |
| 31 | 1.172 | HfP | — | C6 | 0.919 | 1.045 | 21.5 | 37612 | 124952 | 294636 | 3.32 |
| 32 | 1.172 | HfP | — | C6 | 0.928 | 1.2 | 20.5 | 39292 | 122921 | 280307 | 3.13 |

| No. | ξ | Comparative Copolymer | Comon. | Density g/cm³ | I 2 dg/min | I 21/I 2 | Mn | Mw | Mz | Mw/Mn |
|---|---|---|---|---|---|---|---|---|---|---|
| 33 | 1.153 | Borstar FB 2230 | | 0.923 | 0.2 | 110.0 | 12690 | 174650 | 810500 | 13.76 |
| 34 | 1.019 | INEOS Eltex PF6212 | | 0.920 | 1.2 | | 24200 | 97770 | 230100 | 4.04 |
| 35 | 0.989 | Evolue SP3010 | | 0.926 | 0.8 | | 14270 | 118590 | 513300 | 8.31 |
| 36 | 0.982 | Elite 5400GS | C8 | 0.918 | 1 | | 26340 | 100170 | 255700 | 3.80 |
| 37 | 0.924 | Exceed 1018CA | C6 | 0.918 | 1 | | 40680 | 108950 | 210600 | 2.68 |
| 38 | 0.804 | Enable 2010CH | C6 | 0.920 | 1 | | 22580 | 86020 | 183700 | 3.81 |
| 39 | 0.776 | TOTAL M2710EP | | 0.927 | 0.9 | | 31980 | 96170 | 198600 | 3.01 |
| 40 | 0.614 | Dowlex 2045G | C8 | 0.920 | 1 | | 24340 | 111880 | 360700 | 4.60 | from a labile hydrocarbyl, substituted hydrocarbyl, or heteroatom group, or a divalent radical that links to an $R^1$ or $R^2$ group; and ii) a catalyst compound with at least one of the following formulas:

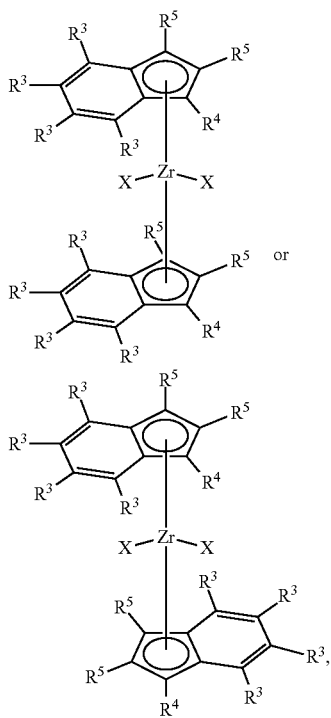

wherein each $R^3$ is independently H, a hydrocarbyl group, a substituted hydrocarbyl group, or a heteroatom group; $R^4$ is a hydrocarbyl group, a substituted hydrocarbyl group, or a heteoatom group; each $R^5$ is independently H, a hydrocarbyl group, a substituted hydrocarbyl group, or a heteroatom group; wherein $R^3$, $R^4$, and $R^5$ are the same or different; wherein $R^3$, $R^4$, or $R^5$ groups are optionally joined with $R^3$, $R^4$, or $R^5$ groups on an opposing cyclopentadienyl structure to form one or more bridges if the number of atoms connecting the two cyclopentadienyl rings is ≥3; and each X is independently a leaving group selected from a labile hydrocarbyl, substituted hydrocarbyl, or heteroatom group, or a divalent radical that links to a $R^3$, $R^4$, or $R^5$ substituent.

2. A method according to claim 1, wherein the catalyst composition further comprises one or more activators or co-catalysts.

3. A method according to claim 1, wherein the comonomer is one or more comonomers containing 3 to 16 carbon atoms.

4. A method according to claim 1, wherein the polymerization is performed in gas phase, slurry phase, solution phase, high pressure or combinations thereof.

5. A method according to claim 1, wherein the polymerization is performed in a single gas phase reactor.

6. A method according to claim 1, wherein the polymerization is performed in a single slurry reactor.

7. A method according to claim 6, wherein the polymerization is performed in a loop slurry reactor.

8. A method according to claim 1, wherein at least one of the two or more of the catalyst compounds is supported on a support.

9. The method according to claim 8, wherein the support comprises silica.

10. The method according to claim 1, further comprising preparing a polyethylene copolymer having a comonomer partitioning tendency of greater than 1.2.

11. The method according to claim 1, further comprising preparing a polyethylene copolymer having a comonomer partitioning tendency of greater than 1.3.

12. The method according to claim 1, further comprising preparing a polyethylene copolymer having a comonomer partitioning tendency of greater than 1.4.

* * * * *